(12) United States Patent
Matsushita et al.

(10) Patent No.: US 10,727,530 B2
(45) Date of Patent: Jul. 28, 2020

(54) POSITIVE ELECTRODE ACTIVE MATERIAL, POSITIVE ELECTRODE, BATTERY, BATTERY PACK, ELECTRONIC DEVICE, ELECTRIC VEHICLE, POWER STORAGE DEVICE, AND POWER SYSTEM

(71) Applicant: MURATA MANUFACTURING CO., LTD., Kyoto (JP)

(72) Inventors: Tadashi Matsushita, Kyoto (JP); Yuya Akiyama, Kyoto (JP); Atsushi Ouki, Kyoto (JP); Takashi Sato, Kyoto (JP); Masaki Kuratsuka, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 116 days.

(21) Appl. No.: 15/997,934

(22) Filed: Jun. 5, 2018

(65) Prior Publication Data

US 2018/0287202 A1    Oct. 4, 2018

Related U.S. Application Data

(63) Continuation of application No. PCT/JP2016/005053, filed on Dec. 2, 2016.

(30) Foreign Application Priority Data

Dec. 9, 2015   (JP) ................................. 2015-240412

(51) Int. Cl.
    *H01M 4/36*       (2006.01)
    *H01M 10/0525*    (2010.01)
          (Continued)

(52) U.S. Cl.
    CPC ......... *H01M 10/0525* (2013.01); *H01M 2/04* (2013.01); *H01M 2/14* (2013.01);
          (Continued)

(58) Field of Classification Search
None
See application file for complete search history.

(56) References Cited

U.S. PATENT DOCUMENTS

| | | | |
|---|---|---|---|
| 8,900,753 | B2 | 12/2014 | Konishi et al. |
| 2012/0132849 | A1 | 5/2012 | Fan |

(Continued)

FOREIGN PATENT DOCUMENTS

| | | |
|---|---|---|
| JP | 2013-045515 A | 3/2013 |
| JP | 2013-065468 A | 4/2013 |

(Continued)

OTHER PUBLICATIONS

European Search Report dated Jul. 1, 2019 in corresponding European Application No. 16872616.4.

(Continued)

*Primary Examiner* — Wojciech Haske
(74) *Attorney, Agent, or Firm* — K&L Gates LLP

(57) ABSTRACT

A positive electrode includes first active material particles, second active material particles, and third active material particles, and the second active material particles include an aggregation of second primary particles. The average particle size D1 of the first active material particles, the average particle size D2 of the second active material particles, and the average particle size D3 of the third active material particles satisfy a relationship of D1>D2>D3. A first particle disintegration rate α1 of the first active material particle and a third particle disintegration rate α2 of the third active material particle are not more than 20%, and a second particle disintegration rate β of the second active material particle is not less than 70%.

19 Claims, 9 Drawing Sheets

(51) Int. Cl.

| | | |
|---|---|---|
| *H01M 4/525* | (2010.01) | |
| *H01M 4/505* | (2010.01) | |
| *H01M 2/04* | (2006.01) | |
| *H01M 2/14* | (2006.01) | |
| *H01M 4/38* | (2006.01) | |
| *H01M 4/583* | (2010.01) | |
| *H01M 10/0587* | (2010.01) | |
| *H01M 4/02* | (2006.01) | |

(52) U.S. Cl.
CPC ............ *H01M 4/36* (2013.01); *H01M 4/364* (2013.01); *H01M 4/366* (2013.01); *H01M 4/381* (2013.01); *H01M 4/505* (2013.01); *H01M 4/525* (2013.01); *H01M 4/583* (2013.01); *H01M 10/0587* (2013.01); *H01M 2004/027* (2013.01); *H01M 2004/028* (2013.01); *H01M 2220/20* (2013.01); *Y02E 60/122* (2013.01)

(56) References Cited

U.S. PATENT DOCUMENTS

| | | |
|---|---|---|
| 2013/0241497 A1 | 9/2013 | Meguro |
| 2013/0260244 A1 | 10/2013 | Choi et al. |
| 2014/0342230 A1 | 11/2014 | Watanabe et al. |
| 2015/0056511 A1 | 2/2015 | Takamatsu et al. |

FOREIGN PATENT DOCUMENTS

| | | |
|---|---|---|
| JP | 2013-191414 A | 9/2013 |
| JP | 2013-214493 A | 10/2013 |
| WO | 2013/046711 A1 | 4/2013 |
| WO | 2015/045719 A1 | 4/2015 |

OTHER PUBLICATIONS

International Search Report and Written Opinion issued in connection with International Patent Application No. PCT/JP2016/005053, dated Jan. 31, 2017. (9 pages).

Japanese Office Action dated Nov. 7, 2018 in corresponding Japanese Application No. 2015-240412.

POSITIVE ELECTRODE ACTIVE MATERIAL, POSITIVE ELECTRODE, BATTERY, BATTERY PACK, ELECTRONIC DEVICE, ELECTRIC VEHICLE, POWER STORAGE DEVICE, AND POWER SYSTEM

CROSS REFERENCE TO RELATED APPLICATIONS

The present application is a continuation of PCT patent application no. PCT/JP2016/005053, filed on Dec. 2, 2016, which claims priority to Japanese patent application no. JP2015-240412 filed on Dec. 9, 2015, the entire contents of which are being incorporated herein by reference.

BACKGROUND

The present technology generally relates to a positive electrode active material, a positive electrode, a battery, a battery pack, an electronic device, an electric vehicle, a power storage device, and a power system.

Nonaqueous electrolyte secondary batteries such as lithium ion secondary batteries have a higher energy density than a lead battery and a nickel cadmium battery, which are conventional aqueous electrolyte secondary batteries, and are therefore significantly expected, and the market is growing remarkably.

Particularly in recent years, studies for improving the characteristics of nonaqueous electrolyte secondary batteries have been actively conducted, because the characteristics of nonaqueous electrolyte secondary batteries, such as lightweight and high energy density, are suitable for use in electric cars and hybrid electric cars.

For example, it has been studied to use a mixture of plural kinds of electrode active materials as an electrode active material for nonaqueous electrolyte secondary batteries.

SUMMARY

The present technology generally relates to a positive electrode active material, a positive electrode, a battery, a battery pack, an electronic device, an electric vehicle, a power storage device, and a power system.

According to an embodiment of the present technology, a positive electrode is provided. The positive electrode includes a first active material particle, a second active material particle, and a third active material particle. The second active material particle includes an aggregation of second primary particles. An average particle size D1 of the first active material particle, an average particle size D2 of the second active material particle, and an average particle size D3 of the third active material particle satisfy a relationship of D1>D2>D3. The first active material particle has a first particle disintegration rate $\alpha 1$ of not more than 20%, and the third active material particle has a third particle disintegration rate $\alpha 2$ of not more than 20%, and the second active material particle has a second particle disintegration rate $\beta$ of not less than 70%.

According to an embodiment of the present technology, a positive electrode active material is provided and includes a first active material particle, a second active material particle, and a third active material particle. The second active material particle includes an aggregation of second primary particles. An average particle size D1 of the first active material particle, an average particle size D2 of the second active material particle, and an average particle size D3 of the third active material particle satisfy a relationship of D1>D2>D3. The first active material particle has a first particle disintegration rate $\alpha 1$ of not more than 20%, the third active material particle has a third particle disintegration rate $\alpha 2$ of not more than 20%, and the second active material particle has a second particle disintegration rate $\beta$ of not less than 70%.

A battery, battery pack, electronic device, electric vehicle, power storage device, and power system of the present technology include the positive electrode described herein according to some embodiments of the present technology.

As described herein, according to some embodiments of the present technology, the volume density of the active material in the positive electrode can be increased. It should be understood that the present technology is not limited to improve the volume density of the active material in the positive electrode and that other suitable properties relating to the present technology may be realized and as further described herein.

DETAILED DESCRIPTION

The present technology generally relates to a positive electrode active material, a positive electrode, a battery, a battery pack, an electronic device, an electric vehicle, a power storage device, and a power system. The present disclosure will be described based on examples with reference to the drawings, but the present disclosure is not to be considered limited to the examples, and various numerical values and materials in the examples are considered by way of example.

Figure 1:
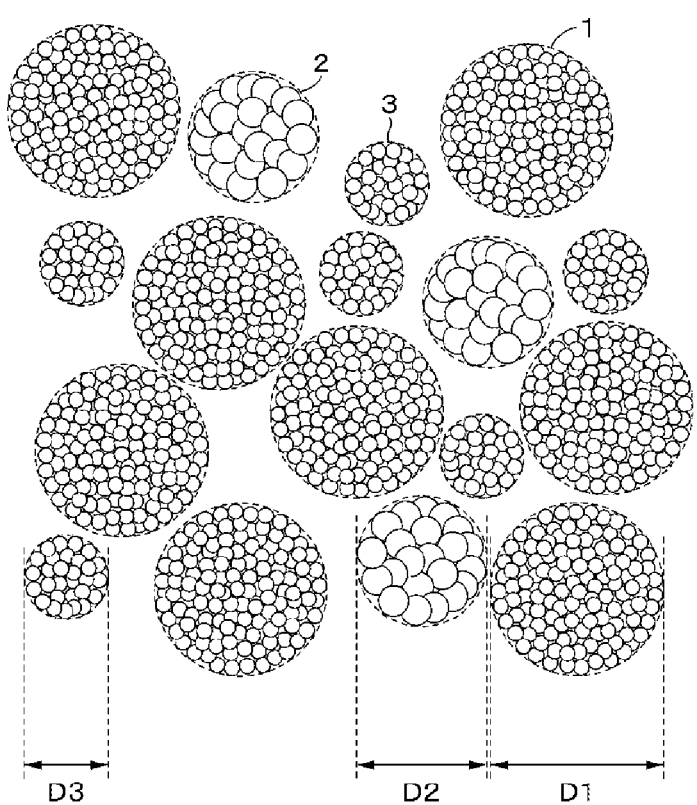
FIG. 1 is a schematic diagram illustrating one configuration example of a positive electrode active material according to an embodiment of the present technology.
Figure 2A:
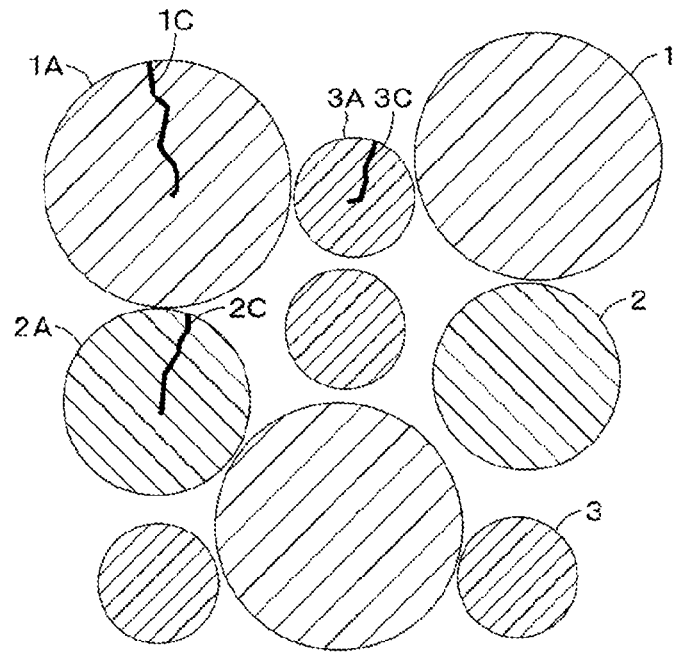
FIG. 2A is a cross-sectional view illustrating an example of positive electrode active material particles not disintegrated by pressing according to an embodiment.
Figure 2B:
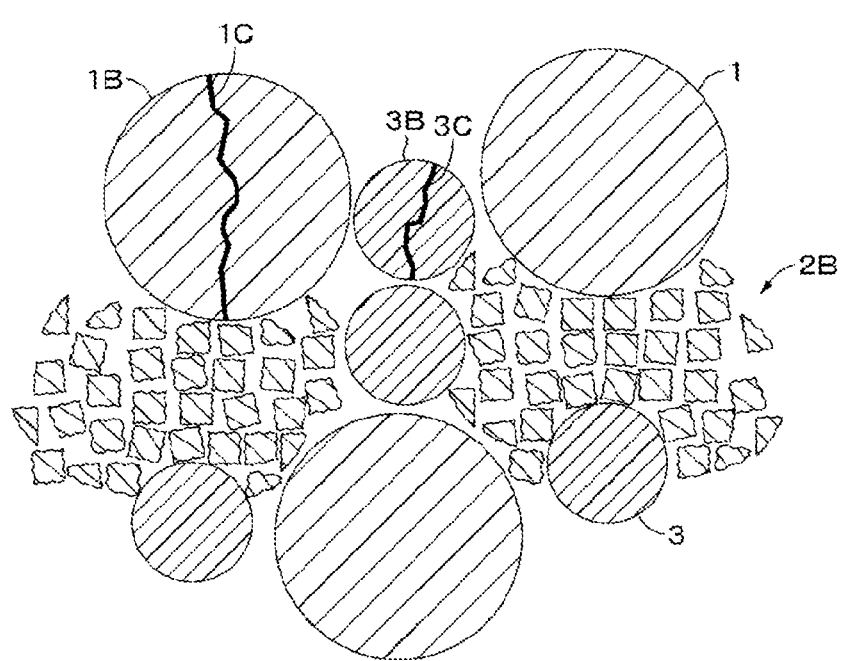
FIG. 2B is a cross-sectional view illustrating an example of positive electrode active material particles disintegrated by pressing according to another embodiment.

As shown in FIG. 1, a positive electrode active material according to an embodiment of the present technology includes first positive electrode active material particles 1, second positive electrode active material particles 2, and third positive electrode active material particles 3. An average particle size D1 of the first positive electrode active material particles 1, an average particle size D2 of the second positive electrode active material particles 2, and an average particle size D3 of the third positive electrode active material particles 3 satisfy a relationship of D1>D2>D3. In an embodiment, the first positive electrode active material particles 1, the second positive electrode active material particles 2, and the third positive electrode active material particles 3 are referred to as large particles 1, middle particles 2, and small particles 3, respectively. When no particular distinction is to be made between the large particles 1, the middle particles 2, and the small particles 3, they are simply referred to as active material particles. As shown in FIGS. 2A and 2B, the large particle 1 in which a crack 1C occurs may be denoted by different reference numerals as large particles 1A and 1B, the middle particle 2 in which a crack 2C occurs may be denoted by a different reference numeral as a middle particle 2A, the middle particle 2 crushed may be denoted by a different reference numeral as a middle particle 2B, and the small particle 3 in which a crack 3C occurs may be denoted by different reference numerals as small particles 3A and 3B.

In an embodiment, the large particle 1, the middle particle 2, and the small particle 3 include aggregated particles formed by aggregation of corresponding primary particles. The average particle size of the primary particles constituting the middle particle 2 is preferably larger than the average particle size of the primary particles constituting the large particle 1 and the small particle 3. This is because the average collapse strength of the middle particle 2 can be made lower than each average collapse strength of the large particle 1 and the small particle 3, that is, a particle disintegration rate $\beta$ of the middle particle 2 can be made higher than a particle disintegration rate $\alpha 1$ of the large particle 1 and a particle disintegration rate $\alpha 2$ of the small particle 3. The average particle size of the primary particles constituting the large particle 1 and the small particle 3 is, for example, not more than 500 nm. The average particle size of the primary particles constituting the middle particle 2 is, for example, more than 500 nm. The respective average particle sizes of the primary particles constituting the large particle 1 and the small particle 3 may be different from each other according to an embodiment.

The large particle 1 and the small particle 3 have a substantially spherical shape. The middle particle 2 may also have a substantially spherical shape; however, since most of the middle particles 2 are disintegrated by pressing at the time of producing the positive electrode, the shape thereof is not particularly limited to a spherical shape, and can have various shapes. For example, the middle particle 2 may have a substantially ellipsoidal, polyhedral, or irregular shape according to some embodiments.

The particle disintegration rate $\alpha 1$ of the large particle 1 is not more than 20% and the particle disintegration rate $\alpha 2$ of the small particle 3 is not more than 20%. If one or both of the particle disintegration rate $\alpha 1$ of the large particle 1 and the particle disintegration rate $\alpha 2$ of the small particle 3 exceeds 20%, for example, the reactivity between the positive electrode active material and an electrolyte are large when a positive electrode including the positive electrode active material is produced. Therefore, a coating film is often formed in the positive electrode active material layer, and this may cause lowering of output of a battery, deterioration of cycle characteristics, and the like. In addition, if one or both of the particle disintegration rate $\alpha 1$ of the large particle 1 and the particle disintegration rate $\alpha 2$ of the small particle 3 exceeds 20%, it is difficult to obtain particle arrangement in which the large particle 1 and the small particle 3 have a hexagonal close-packed structure or a structure similar to the hexagonal close-packed structure when a positive electrode mixture slurry containing the positive electrode active material is applied and dried. Thus, even if the positive electrode is pressed and compressed after drying, it may be difficult to increase the volume density of the active material in the positive electrode (hereinafter simply referred to as "the volume density of the positive electrode").

IN an embodiment, the particle disintegration rate $\beta$ of the middle particle 2 is not less than 70%. If the particle disintegration rate $\beta$ of the middle particle 2 is less than 70%, the number of the middle particles 2 to be disintegrated is small and it becomes difficult to sufficiently fill voids in the positive electrode active material layer, when pressing is performed after a positive electrode mixture slurry containing the positive electrode active material is applied and dried, so that the volume density of the positive electrode may decrease.

The particle disintegration rate $\alpha 1$ of the large particle 1 is determined as follows according to an embodiment. First, a positive electrode including a positive electrode active material is produced. A method of producing the positive electrode will be described later. Then, an ion milling system E-3500 manufactured by Hitachi, Ltd. is used to obtain a cross section of the positive electrode, and scanning electron microscope (hereinafter referred to as "SEM") manufactured by Hitachi High-Technologies Corporation is used to take a SEM image of the cross section. Thereafter, using image analysis software, ten large particles 1 are randomly selected from the SEM image of the cross section, and among these large particles 1, the number of particles in which disintegration is confirmed (specifically, the particles in which disintegration is confirmed on a surface observed in the SEM image) is determined. Then, the processing of determining the number of the large particles 1 disintegrated is performed for ten SEM images of the cross section, and among (10×10) large particles 1, the proportion of the large particles 1 in which disintegration has been confirmed ((N/100)×100, where N is the number of the large particles 1 in which disintegration has been confirmed) is determined and taken as the particle disintegration rate $\alpha 1$. The particle disintegration rate $\alpha 2$ of the small particle 3 and the particle disintegration rate $\beta$ of the middle particle 2 can be determined in the same manner as in the particle disintegration rate $\alpha 1$ of the large particle 1 described herein.

The term "disintegration" used herein means, for example: (1) a state in which it is observed in the SEM image that the active material particle is completely broken into two or more pieces by cracks (see "the large particle 1B in which the crack 1C has occurred" and "the small particle 3B in which the crack 3C has occurred" in FIG. 2B) and (2) a state in which it is observed in the SEM image that the active material particle is crushed and the number of voids increases between the primary particles constituting the active material particle (see "the middle particle 2B disintegrated" in FIG. 2B). However, a state in which although occurrence of cracks is confirmed in the active material particle in the SEM image, the active material particle is not broken into two or more pieces by the cracks (see "the large particle 1A in which the crack 1C has occurred, "the middle particle 2A in which the crack 2C has occurred", and "the small particle 3A in which the crack 3C has occurred" in FIG. 2A) is not included in the disintegration.

In the embodiment as described herein, the states of aggregation of the large particles 1, the middle particles 2, and the small particles 3 are adjusted such that while the large particles 1 and the small particles 3 disintegrated by positive electrode press are usually in the state of (1), the middle particles 2 disintegrated by positive electrode press are usually in the state of (2).

The average particle size D1 of the large particles 1 is preferably not less than 12 µm and not more than 25 µm, and the average particle size D3 of the small particles 3 is preferably not less than 1 µm and not more than 6 µm according to an embodiment. When the average particle size D1 of the large particles 1 and the average particle size D3 of the small particles 3 are within the above ranges, the large particles 1 and the middle particles 2 can easily take a hexagonal close-packed structure or a structure similar to the hexagonal close-packed structure in the case where the positive electrode mixture slurry containing the positive electrode active material is applied and dried, so that the volume density of the positive electrode is increased.

The average particle size D2 of the middle particles 2 is preferably not less than 3 µm and not more than 12 µm according to an embodiment. If the average particle size D2 of the middle particles 2 is more than 12 µm, it becomes difficult for the middle particles 2 to enter gaps between the large particles 1 and the small particles 3 when the positive electrode mixture slurry containing the positive electrode active material is applied and dried, so that it may become difficult to increase the volume density of the positive electrode. On the other hand, if the average particle size D2 of the middle particles 2 is less than 3 µm, the middle particles 2 disintegrated may be difficult to efficiently fill the gaps between the large particles 1 and the small particles 3 even if the middle particles 2 are disintegrated after the positive electrode mixture slurry containing the positive electrode active material is applied and dried. Further, when the positive electrode mixture slurry containing the positive electrode active material is prepared, a large amount of binder is required, so that battery characteristics may be deteriorated.

The average particle size D1 of the large particles 1 is determined as follows according to an embodiment. First, an SEM image of a positive electrode active material is taken using SEM manufactured by Hitachi High-Technologies Corporation. Thereafter, using image analysis software, ten large particles 1 are randomly selected from the SEM image, and each area of the large particles 1 (the area when the large particle 1 is observed from one direction in the SEM image) is determined. Then, assuming that each of the large particles 1 is spherical, a particle size (diameter) R is determined from the following formula:

$$R=2\times(S/\pi)^{1/2}, \text{ where } S \text{ is an area when the large particle 1 is observed from one direction.}$$

The processing of determining the particle size of the large particle 1 described above is performed for ten SEM images, and the determined particle sizes of (10×10) large particles 1 are simply averaged (arithmetically averaged) to determine the average particle size D1 of the large particles 1. The average particle size D2 of the middle particles 2 and the average particle size D3 of the small particles 3 can be determined in the same manner as in the average particle size D1 of the large particles 1 described herein.

In the measurement of the average particle size, the large particle 1, the middle particle 2 and the small particle 3 in the SEM image are discriminated as follows. Since the large particle 1 and the small particle 3 are clearly different from each other in size, it is possible to easily discriminate both from each other in the SEM image. On the other hand, the large particle 1 and the middle particle 2 can be discriminated from each other based on, for example: (1) the size of the active material particle, (2) the disintegration property of the active material particle, (3) the size of the primary particles constituting the active material particle (aggregated particle), and the like. Also, the middle particle 2 and the small particle 3 can be discriminated from each other based on (1) to (3) described above, and the like.

According to an embodiment, a first proportion or ratio R1 (=(M1/(M1+M3))×100) of a content M1 of the large particles 1 to the total amount of the content M1 of the large particles 1 and a content M3 of the small particles 3 is preferably not less than 55 vol % and not more than 85 vol %, and a second proportion or ratio R2 (=(M3/(M1+M3))×100) of the content M3 of the small particles 3 to the total amount of the content M1 of the large particles 1 and the content M3 of the small particles 3 is preferably not less than 15 vol % and not more than 45 vol %. If the proportions R1 and R2 are out of the above ranges, it is difficult to obtain secondary particle arrangement in which the large particles 1 and the small particles 3 have a hexagonal close-packed structure or a structure similar to the hexagonal close-packed structure when a positive electrode mixture slurry containing the positive electrode active material is applied and dried. Thus, even if the positive electrode is pressed and compressed after drying, it may be difficult to increase the volume density of the positive electrode.

The proportions R1 and R2 are determined as follows according to an embodiment. First, in the same manner as in "Method of Measuring Average Particle Size", the average particle size D1 of the large particles 1 and the average particle size D3 of the small particles 3 are determined. Next, assuming that the large particles 1 having a spherical shape and the determined average particle size D1 as the particle size and the small particles 3 having a spherical shape and the determined average particle size D3 as the particle size are hexagonally close-packed, the content M1 of the large particles 1 and the content M3 of the small particles 3 are determined by geometric filling calculation. Then, the proportions R1 and R2 are determined using these contents M1 and M3.

A third proportion or ratio R3 (=(M2/M3)×100) of a content M2 of the middle particles 2 to the content M3 of the small particles 3 is preferably not more than 50 vol %. If the proportion R3 exceeds 50 vol %, it becomes such a state that the small particles 3 exists in gaps formed by the large particles 1 and the middle particles 2 when a positive electrode mixture slurry containing the positive electrode active material is applied and dried. Thus, even if the positive electrode is pressed and compressed after drying, it is difficult for the small particles 3 to be densely packed in the gaps formed by the large particles 1 and the middle particles 2, and as a result, it may be difficult to increase the volume density of the positive electrode.

The third proportion R3 is determined as follows according to an embodiment. First, in the same manner as in "Method of Measuring Average Particle Size", ten middle particles 2 are randomly selected from an SEM image, and each area of the middle particles 2 (the area when the middle particle 2 is observed from one direction in the SEM image) is determined. Then, the processing of determining the particle size described above is performed on ten SEM images, and each area of (10×10) middle particles 2 is determined. Then, each area of (10×10) small particles 3 is determined in the same manner as in the case where each area of the middle particles 2 is determined as described above. Then, assuming that the middle particles 2 and the small particles 3 are spherical, the proportion R3 is determined using the determined areas of the middle particles 2 and the small particles 3.

An average collapse strength of each of the large particle 1 and the small particle 3 is a physical property value serving as an index of each of the particle disintegration rates α1 and α2, and is preferably not less than 300 MPa according to an embodiment. If the average collapse strength of each of the large particle 1 and the small particle 3 is less than 300 MPa, the particle disintegration rate α1 of the large particle 1 and the particle disintegration rate α2 of the small particle 3 become too high, so that the particle disintegration rates α1 and α2 may fall outside the above range.

An average collapse strength of the middle particle 2 is a physical property value serving as an index of the particle disintegration rate β, and is preferably not more than 100 MPa. If the average collapse strength of the middle particles 2 exceeds 100 MPa, the particle disintegration rate β of the middle particle 2 becomes too low, so that the particle disintegration rate β may fall outside the above range.

The average collapse strength of the large particle 1 is determined as follows according to an embodiment. Secondary particles within the range of the average particle size D1 of the large particles 1 described above are selected in the number of 100, and a particle collapse strength of each of the secondary particles is measured using a micro-compression tester MCT510 manufactured by Shimadzu Corporation, and the obtained collapse strengths are simply averaged (arithmetically averaged) to determine the average collapse strength. The average collapse strength of the middle particle 2 and the average collapse strength of the small particle 3 can be determined in the same manner as in the average collapse strength of the large particle 1 described above.

The primary particles constituting the large particle 1, the middle particle 2 and the small particle 3, for example first primary particles, second primary particles and third primary particles, respectively contain a positive electrode active material capable of inserting and extracting lithium that is an electrode reactant. As the positive electrode active material capable of inserting and extracting lithium, lithium-containing compounds containing lithium, a transition metal element and oxygen (O) are preferable in order to increase the energy density. As such lithium-containing compounds, a lithium composite oxide having a layered rock salt type structure is preferable. The lithium composite oxide more preferably contains Ni as a transition metal. Examples of the lithium composite oxide containing Ni can include a lithium composite oxide containing lithium, nickel, cobalt, manganese and oxygen (hereinafter referred to as "NCM") and a lithium composite oxide containing lithium, nickel, cobalt, aluminum and oxygen (hereinafter referred to as "NCA"), and NCA is preferably used. This is because these compounds can particularly increase the volume density of the positive electrode.

It is preferable that the large particle 1 and the small particle 3 have average composition represented by the following formula (1):

$$Li_{v1}Ni_{w1}M1'_{x1}O_{z1} \quad (1)$$

(In the formula, $0<v1<2$, $w1+x1\le1$, $0.2\le w1\le1$, $0\le x1\le0.7$, $0<z1<3$, and M1' includes one or more elements of transition metals selected from the group consisting of Co (cobalt), Fe (iron), Mn (manganese), Cu (copper), Zn (zinc), Al (aluminum), Cr (chromium), V (vanadium), Ti (titanium), Mg (magnesium), and Zr (zirconium)).

It is preferable that the middle particle 2 has average composition represented by the following formula (2):

$$Li_{v2}Ni_{w2}M2'_{x2}O_{z2} \quad (2)$$

(In the formula, $0<v2<2$, $w2+x2\le1$, $0.65\le w2\le1$, $0\le x2\le0.35$, $0<z2<3$, and M2' includes one or more elements of transition metals selected from the group consisting of Co (cobalt), Fe (iron), Mn (manganese), Cu (copper), Zn (zinc), Al (aluminum), Cr (chromium), V (vanadium), Ti (titanium), Mg (magnesium), and Zr (zirconium)).

Figure 3A:
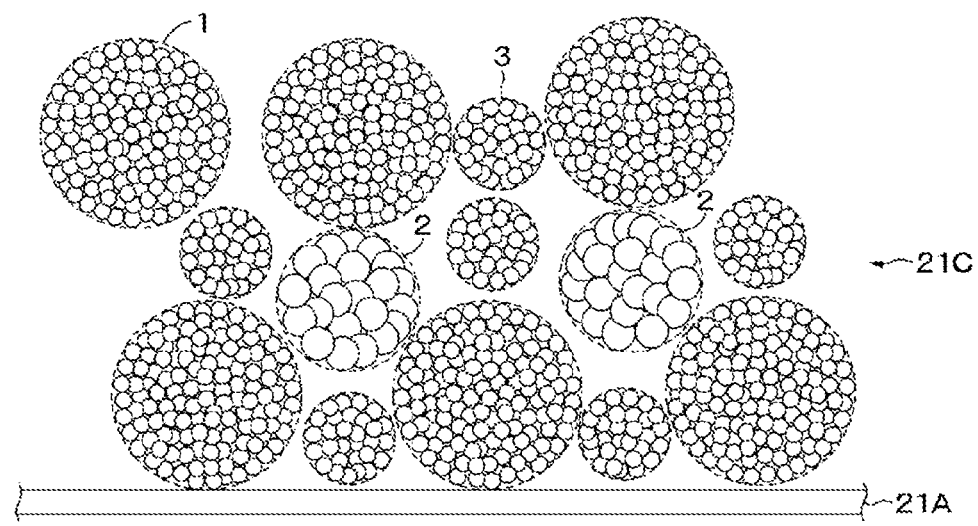
FIG. 3A is a schematic diagram illustrating an example of a state of the positive electrode active material before pressing according to an embodiment.
Figure 3B:
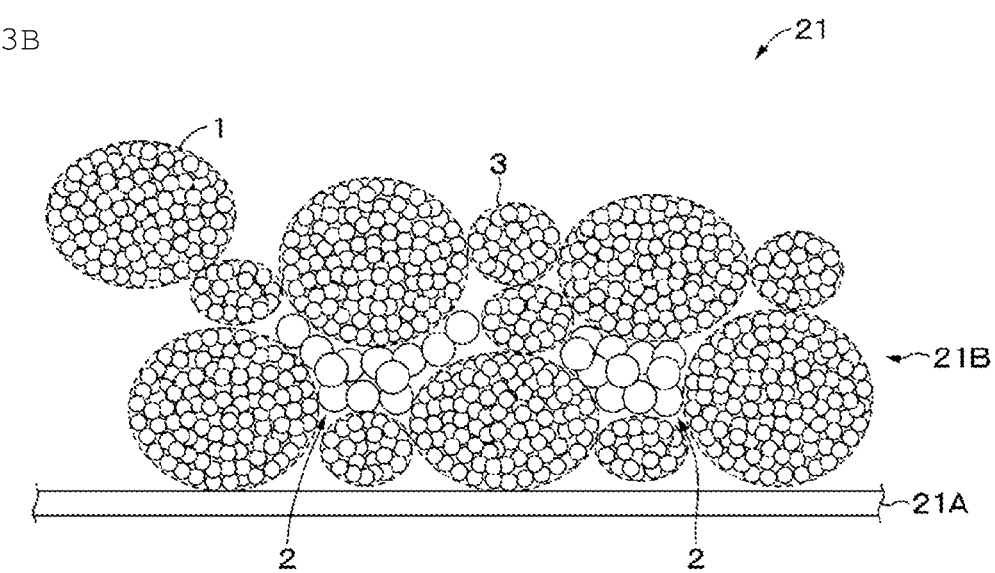
FIG. 3B is a schematic diagram illustrating an example of a state of the positive electrode active material after pressing according to another embodiment.

Hereinafter, with reference to FIGS. 3A and 3B, an example of a method of producing a positive electrode using the positive electrode active material described above will be described.

First, for example, the positive electrode active material described herein, a conductive agent and a binder are mixed to prepare a positive electrode mixture, and the positive electrode mixture is dispersed in a solvent such as N-methyl-2-pyrrolidone (NMP) according to an embodiment, thus producing a paste-like positive electrode mixture slurry. Then, as shown in FIG. 3A, this positive electrode mixture slurry 21C thus produced is applied to a positive electrode current collector 21A, and the solvent is dried. At this time, the large particles 1 and the small particles 3 tend to be arranged to take a hexagonal close-packed structure or a structure similar to the hexagonal close-packed structure. On the other hand, the middle particles 2 tend to be arranged in gaps between the large particles 1 and the small particles 3 arranged in the hexagonal close-packed structure.

Then, the dried positive electrode mixture slurry 21C is compression molded by a roll press machine or the like to form a positive electrode active material layer. A linear pressure at this time is, for example, 10 kN/cm. As a result, as shown in FIG. 3B, the large particles 1 and the small particles 3 contained in the positive electrode mixture slurry 21C are slightly deformed but maintain a substantially spherical shape. Since the particle disintegration rate α1 of the large particle 1 and the particle disintegration rate α2 of the small particle 3 are as low as not more than 20% as described above, most of the large particles 1 and the small particles 3 are not disintegrated, and their states are almost the same as those before pressing except for slight deformation of the large particles 1 and the small particles 3 (see FIG. 2A). In a small number of the large particles 1 and the small particles 3 which have been disintegrated, although the large particles 1 and the small particles 3 are completely broken into two or more pieces due to occurrence of cracks, the shape before pressing is substantially maintained (see FIG. 2B). On the other hand, since the particle disintegration rate β of the middle particle 2 is as high as not less than 70% as described above, most of the middle particles 2 are broken down and disintegrated and fill the gaps between the large particles 1 and the small particles 3 (see FIG. 2B). In a small number of the middle particles 2 which are not disintegrated, the state of the middle particles 2 is almost the same as that before pressing except for slight deformation of the middle particles 2 (see FIG. 2A). Thus, a target positive electrode 21 is obtained.

The positive electrode active material according to an embodiment includes the large particles 1, the middle particles 2, and the small particles 3. The middle particles 2, for example, are aggregated particles formed by aggregation of primary second particles, and the average particle size D1 of the large particles 1, the average particle size D2 of the middle particles 2, and the average particle size D3 of the small particles 3 satisfy a relationship of D1>D2>D3. The particle disintegration rate α1 of the large particle 1 and the particle disintegration rate α2 of the small particle 3 are not more than 20%, and the particle disintegration rate β of the middle particle 2 is not less than 70%. When the positive electrode active material having such a configuration is pressed to produce a positive electrode, the large particles 1 and the small particles 3 are easily arranged to take a close-packed structure or a structure similar to the close-packed structure. Most of the middle particles 2 are disintegrated and broken down by pressing to fill the gaps between the large particles 1 and the small particles 3. Accordingly, the volume density of the positive electrode can be increased. When a battery including this positive electrode is produced, the capacity of the battery can be increased according to embodiments of the present technology.

As a method of increasing the volume density of the positive electrode, a method of increasing the pressing pressure at the time of pressing and a method of repeating pressing a plurality of times are generally known. However, when these mechanical methods are used, foil breakage of a current corrector and warpage of the positive electrode may occur. Thus, in this method, it should be understood that the positive electrode itself is designed to be easily crushed according to an embodiment. On the other hand, in the first embodiment, the positive electrode active material containing the large particles 1, the middle particles 2, and the small particles 3 having different average particle sizes is used, and the large particles 1 and the small particles 3 are filled in a close-packed state or a state similar to the close-packed state in the positive electrode. At the time of pressing, a certain percentage or more of the middle particles 2 are disintegrated, and a void portion present in the positive electrode is filled with the middle particles 2 disintegrated. Consequently, the volume density of the positive electrode can be increased. Accordingly, it is possible to suppress occurrence of the foil breakage of the current collector and the warpage of the positive electrode.

In the embodiment described herein, description is made to the case where the large particles, the middle particles, and the small particles are aggregated particles formed by aggregation of primary particles, the present technology is not limited to this example. For example, the large particles and the middle particles may be primary particles as non-aggregated particles, and the middle particles may be aggregated particles formed by aggregation of primary particles.

When the large particles and the small particles are formed by primary particles, it is preferable that the large particles and the small particles have average composition represented by the following formula (3):

(3)

(In the formula, $0<v3<2$, $w3+x3\le1$, $0.8\le w3\le1$, $0\le x3\le0.2$, $0<z3<3$, and M3' includes one or more elements of transition metals selected from the group consisting of Ni (nickel), Fe (iron), Mn (manganese), Cu (copper), Zn (zinc), Al (aluminum), Cr (chromium), V (vanadium), Ti (titanium), Mg (magnesium), and Zr (zirconium)).

When the middle particles are aggregated particles, it is preferable that the middle particles have average composition represented by the following formula (4):

(4)

(In the formula, $0<v4<2$, $w4+x4\le1$, $0.65\le w4\le1$, $0\le x4\le0.35$, $0<z4<3$, and M4' includes one or more elements of transition metals selected from the group consisting of Co (cobalt), Fe (iron), Mn (manganese), Cu (copper), Zn (zinc), Al (aluminum), Cr (chromium), V (vanadium), Ti (titanium), Mg (magnesium), and Zr (zirconium)).

In the positive electrode active material according to this variation, the large particle 1, the middle particle 2 and the small particle 3 in an SEM image are discriminated as follows. Since the large particle 1 and the small particle 3 are clearly different from each other in size, it is possible to easily discriminate both from each other in the SEM image. On the other hand, the large particle 1 and the middle particle 2 can be discriminated from each other based on, for example: (1) the size of the active material particle, (2) the disintegration property of the active material particle, (3) the size of the primary particle constituting the active material particle (aggregated particle), (4) whether or not the active material particles are aggregated particles, and the like. Also, the middle particle 2 and the small particle 3 can be discriminated from each other based on (1) to (4) described above, and the like.

In an embodiment, a nonaqueous electrolyte secondary battery including a positive electrode containing the positive electrode active material according to the embodiment will be described.

Figure 4:
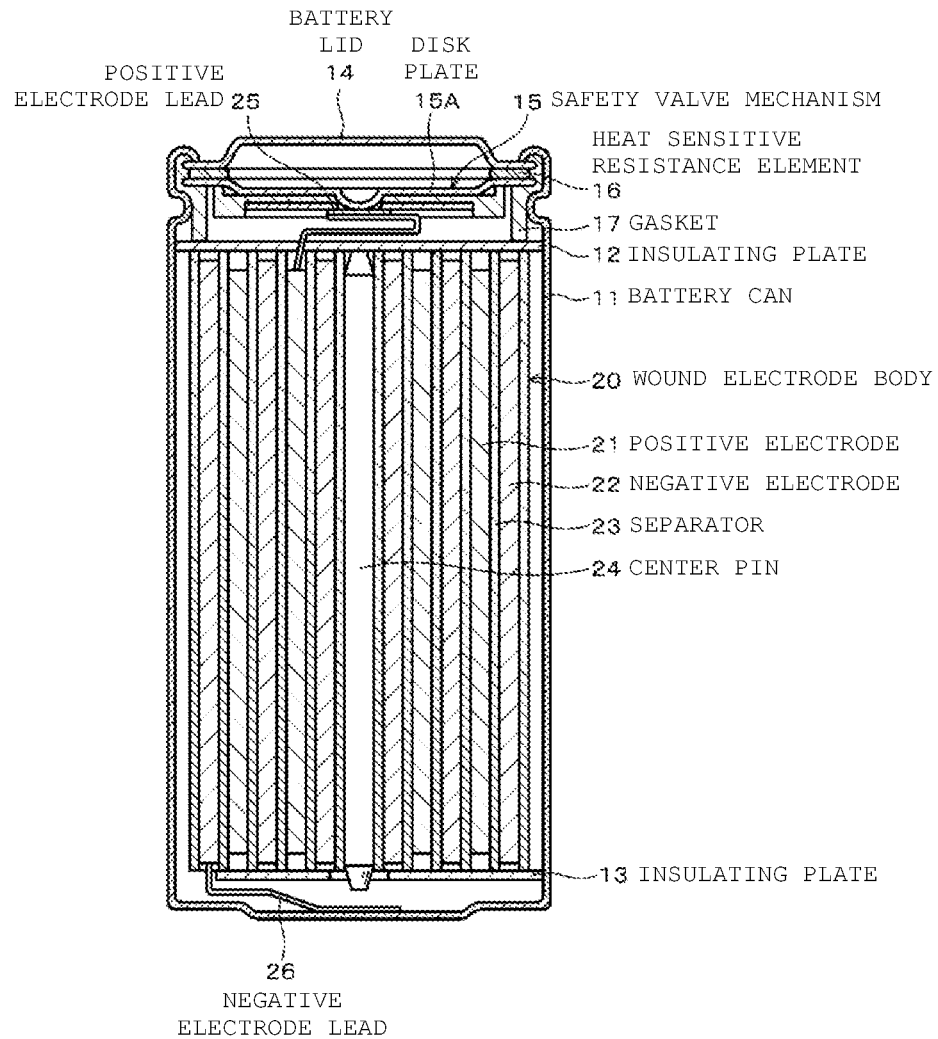
FIG. 4 is a cross-sectional view illustrating one configuration example of a nonaqueous electrolyte secondary battery according to an embodiment of the present technology.

Hereinafter, a configuration example of a nonaqueous electrolyte secondary battery according to an embodiment of the present technology will be described with reference to FIG. 4. This nonaqueous electrolyte secondary battery is, for example, a so-called lithium ion secondary battery inn which negative electrode capacity is represented by a capacity component based on insertion and extraction of lithium (Li) that is an electrode reactant. This nonaqueous electrolyte secondary battery is a so-called cylinder type battery, and includes a wound electrode body 20 formed by stacking a pair of positive electrode 21 having a strip shape and negative electrode 22 having a strip shape with a separator 23 interposed between the positive electrode 21 and the negative electrode 22 and winding the resulting stacked body in a battery can 11 having a substantially hollow cylindrical shape. The battery can 11 is made of nickel (Ni)-plated iron (Fe). One end of the battery can 11 is closed, and the other end is open. An electrolytic solution as an electrolyte is injected into the battery can 11 and impregnated in the positive electrode 21, the negative electrode 22, and the separator 23. Further, a pair of insulating plates 12 and 13 are respectively arranged vertically to the winding periphery so as to sandwich the wound electrode body 20.

A battery lid 14, and a safety valve mechanism 15 and a heat sensitive resistance element (positive temperature coefficient element (PTC element)) 16 provided on an inner side of this battery lid 14 are attached to an open end portion of the battery can 11 by caulking via a sealing gasket 17. The interior of the battery can 11 is thus hermetically sealed. The battery lid 14 is made of, for example, the same material as the battery can 11. The safety valve mechanism 15 is electrically connected with the battery lid 14, and when the internal pressure of a battery becomes a certain level or more by internal short circuit, heating from an outside, or the like, a disk plate 15A is reversed to cut an electrical connection between the battery lid 14 and the wound electrode body 20. The sealing gasket 17 is made of, for example, an insulating material, and has asphalt applied on its surface.

For example, a center pin 24 is inserted in the center of the wound electrode body 20. In the wound electrode body 20, a positive electrode lead 25 made of aluminum (Al) or the like is connected to the positive electrode 21, and a negative electrode lead 26 made of nickel or the like is connected to the negative electrode 22. The positive electrode lead 25 is electrically connected to the battery lid 14 by being welded to the safety valve mechanism 15, and the negative electrode lead 26 is electrically connected by being welded to the battery can 11.

Figure 5:
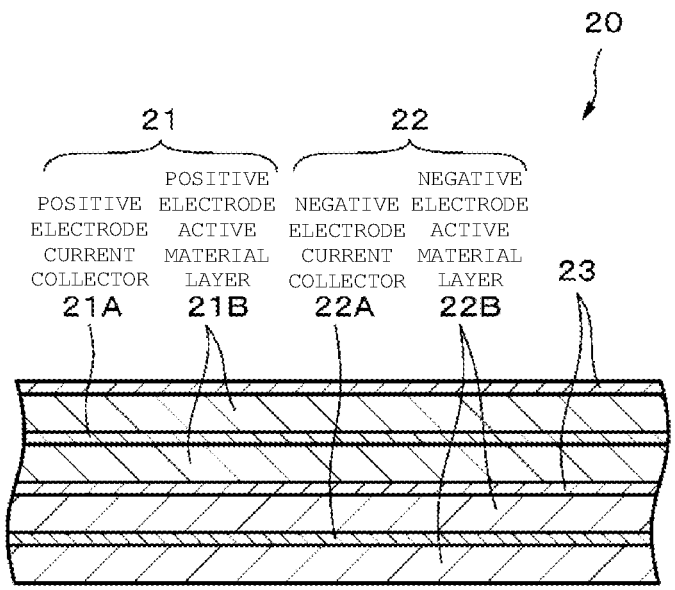
FIG. 5 is a partially enlarged sectional view of the wound electrode body shown in FIG. 4 in an embodiment.

Hereinafter, the positive electrode 21, the negative electrode 22, the separator 23, and the electrolytic solution constituting the nonaqueous electrolyte secondary battery will be sequentially described with reference to FIG. 5.

For example, the positive electrode 21 has a structure in which a positive electrode active material layer 21B is provided on each surface of a positive electrode current collector 21A according to an embodiment. Although not illustrated, the positive electrode active material layer 21B may be provided only on one surface of the positive electrode current collector 21A. The positive electrode current collector 21A is made of, for example, a metal foil such as an aluminum foil, a nickel foil, or a stainless steel foil. The positive electrode active material layer 21B contains, for example, a positive electrode active material capable of inserting and extracting lithium that is an electrode reactant. The positive electrode active material layer 21B may further contain an additive as necessary. The additive can be, for example, at least one of a conductive agent and a binder.

The positive electrode active material is the positive electrode active material according to the embodiment described herein. When a cross-sectional SEM image of the positive electrode 21 is observed, the large particle 1, the middle particle 2 and the small particle 3 not disintegrated by pressing are usually in the following states in the positive electrode 21 after pressing.

Large particle 1 not disintegrated by pressing: a state in which occurrence of cracks is not confirmed, and the shape (for example, substantially spherical shape) substantially similar to that before pressing is maintained, or a state in which the occurrence of cracks is confirmed, but the large particle 1 is not broken into two or more pieces due to the cracks, and the shape (for example, substantially spherical shape) similar to that before pressing is maintained (see "the large particle 1 in which the crack 1C does not occur" and "the large particle 1A in which the crack 1C occurs" in FIG. 2A).

Middle particle 2 not disintegrated by pressing: a state similar to the large particle 1 not disintegrated by pressing (see "the middle particle 2 in which the crack 2C does not occur" and "the middle particle 2A in which the crack 2C occurs" in FIG. 2A).

Small particle 3 not disintegrated by pressing: a state similar to the large particle 1 not disintegrated by pressing (see "the small particle 3 in which the crack 3C does not occur" and "the small particle 3A in which the crack 3C occurs" in FIG. 2A).

The average particle size D1 of the large particles 1, the average particle size D2 of the middle particles 2, and the average particle size D3 of the small particles 3 in the positive electrode 21 are substantially the same before and after pressing.

On the other hand, when a cross-sectional SEM image of the positive electrode 21 after pressing is observed, the large particles 1, the middle particles 2 and the small particles 3 disintegrated by pressing are usually in the following states in the positive electrode 21 after pressing.

Large particle 1 disintegrated by pressing: a state in which although the small particle 1 is completely broken into two or more pieces due to occurrence of cracks, the shape before pressing is substantially maintained (see "the large particle 1B in which the crack 1C has occurred" in FIG. 2B).

Middle particle 2 disintegrated by pressing: a state in which the middle particle 2 is broken, so that many voids are formed between the primary particles constituting the middle particle 2 (see "the middle particle 2B broken by disintegration" in FIG. 2B).

Small particle 3 disintegrated by pressing: a state similar to the large particle 1 not disintegrated by pressing (see "the small particle 3B in which the crack 3C has occurred" in FIG. 2B).

Even if the large particle 1 and the small particle 3 are disintegrated, the particle shape is substantially maintained before and after pressing as described herein. Accordingly, regarding the large particle 1 and the small particle 3, it is possible to visually discriminate whether or not a disintegrated particle included in the cross-sectional SEM image of the positive electrode 21 after pressing has been the large particle 1 or the small particle 3 before disintegration. On the other hand, when the middle particle 2 is disintegrated, the middle particle 2 is broken as described above. Accordingly, regarding the middle particle 2, although it is difficult to visually discriminate whether or not a disintegrated particle included in the cross-sectional SEM image of the positive electrode 21 after pressing has been the middle particle 2 before disintegration, this can be estimated by the following method according to an embodiment.

First, an ion milling system E-3500 manufactured by Hitachi, Ltd. is used to obtain a cross section of the positive electrode 21, and SEM manufactured by Hitachi High-Technologies Corporation is used to take a SEM image of the cross section. Thereafter, using image analysis software, areas of broken particle fragments are added up to determine an area S of a particle before disintegration. Then, assuming that a secondary particle is spherical, a particle size (diameter) R is determined from the following formula:

$$R = 2 \times (S/\pi)^{1/2}$$

Then, the processing of determining the particle size described above is performed for ten SEM images, and the determined particle sizes of (10×10) secondary particles are simply averaged (arithmetically averaged) to determine the average particle size of the secondary particles. Then, it is confirmed whether or not the determined average particle size of the secondary particles is within the range of the average particle size D2 of the middle particles 2 described above: not less than 3 μm and not more than 12 μm. When it has been confirmed that the determined average particle size of the secondary particles is within the range of the average particle size D2, it is estimated that the disintegrated particles included in the cross-sectional SEM image have been the middle particles 2 before disintegration.

Each numerical range of the particle disintegration rate, the average particle size, the proportions R1 and R2 (mixing ratio of large particles and small particles), and the proportion R3 (mixing ratio of middle particles and small particles) is the same as that in the above first embodiment. The particle disintegration rate, the average particle size, and the proportions R1, R2, and R3 are determined as follows with use of the large particles, the middle particles, and the small particles included in the positive electrode 21 after pressing.

The particle disintegration rate α1 of the large particle in the positive electrode 21 after pressing is determined as follows. First, an ion milling system E-3500 manufactured by Hitachi, Ltd. is used to obtain a cross section of the positive electrode 21, and SEM manufactured by Hitachi High-Technologies Corporation is used to take a SEM image of the cross section. The particle disintegration rate α1 of the large particle 1 is determined in the same manner as in the first embodiment except that the cross-sectional SEM image thus taken is used. The particle disintegration rate α2 of the small particle 3 and the particle disintegration rate β of the middle particle 2 can be determined in the same manner as in the particle disintegration rate α1 of the large particle 1 described herein.

The average particle size and the proportions or ratios R1, R2, and R3 can also be determined in the same manner as in the embodiment except that a cross-sectional SEM image formed in the same manner as described herein is used. However, when the area of the middle particle 2 is determined, in the case where a middle particle 2 that is not disintegrated is present in the taken cross-sectional SEM image, the area of the middle particle 2 is determined using the middle particle 2 that is not disintegrated. On the other hand, in the case where no middle particle 2 that is not disintegrated is present in the taken cross-sectional SEM image, as described herein, the areas of broken particle fragments are added up to determine the area of the middle particle 2 before disintegration. Whether or not a disintegrated particle has been the middle particle 2 before disintegration can be estimated from the method as described herein.

A preferable volume density of the positive electrode 21 varies depending on the type of the positive electrode active material constituting the large particle, the middle particle, and the small particle. For example, when the large particle, the middle particle, and the small particle contain NCA, the volume density of the positive electrode 21 is preferably not less than 3.65 g/cm$^3$. When the large particle and the small particle contain NCM and the middle particle contains NCA, the volume density of the positive electrode 21 is preferably not less than 3.45 g/cm$^3$. When the large particle and the small particle contain lithium cobalt oxide (LiCoO$_2$, hereinafter referred to as "LCO") and the middle particle contains NCA, the volume density of the positive electrode 21 is preferably not less than 3.80 g/cm$^3$.

The volume density of the positive electrode 21 may be determined from the positive electrode 21 pressed before being assembled as a battery or may be determined from the positive electrode 21 taken out by disassembling the battery according to an embodiment. However, in the case of measuring the volume density using the positive electrode 21 after disassembling the battery, the positive electrode 21 taken out by disassembling the battery is used after the battery before disassembly is discharged to 2.5 V.

As a binder, for example, at least one selected from resin materials such as polyvinylidene fluoride (PVdF), polytetrafluoroethylene (PTFE), polyacrylonitrile (PAN), styrene-butadiene rubber (SBR), and carboxymethyl cellulose (CMC), copolymers mainly containing these resin materials, and the like is used.

Examples of a conductive agent include carbon materials such as graphite, carbon black, and Ketjen black. These materials can be used singly or in mixture of two or more kinds thereof. A metal material, a conductive polymer material, or the like may be used as long as the material has conductivity, in addition to the carbon material.

For example, the negative electrode 22 has a structure in which a negative electrode active material layer 22B is provided on each surface of a negative electrode current collector 22A. Although not illustrated, the negative electrode active material layer 22B may be provided only on one surface of the negative electrode current collector 22A. The negative electrode current collector 22A is made of, for example, a metal foil such as a copper foil, a nickel foil, or a stainless steel foil.

The negative electrode active material layer 22B contains one or more kinds of negative electrode active materials capable of inserting and extracting lithium. The negative electrode active material layer 22B may further contain additives such as a binder and a conductive agent as necessary.

In this nonaqueous electrolyte secondary battery, the electrochemical equivalent of the negative electrode 54 or the negative electrode active material is greater than the electrochemical equivalent of the positive electrode 21, and it is theoretically preferable that lithium metal does not precipitate on the negative electrode 22 during charging.

Examples of the negative electrode active material include carbon materials such as hardly graphitizable carbon, easily graphitizable carbon, graphite, pyrocarbons, cokes, glassy carbons, organic polymer compound burnt body, carbon fiber, and activated carbon. Among these, examples of the cokes include pitch coke, needle coke, petroleum coke and the like. The organic polymer compound burnt body refers to a carbonized material obtained by baking a polymer material such as a phenol resin or a furan resin at an appropriate temperature. Some of such carbonized materials are classified as hardly graphitizable carbon or easily graphitizable carbon. These carbon materials are preferred because they exhibit very little change in their crystal structures during charging and discharging, and provide a high charge/discharge capacity and excellent cycle characteristics. Graphite is especially preferred, as it has a large electrochemical equivalent and provides a high energy density. Further, hardly graphitizable carbon is preferable because it provides excellent cycle characteristics. Furthermore, it is preferable to use a carbon material having a low charge/discharge potential, specifically, a carbon material having a charge/discharge potential that is close to that of lithium metal, because the higher energy density can be easily realized for the battery.

Examples of other negative electrode active materials capable of increasing the capacity include materials containing at least one of a metal element and a metalloid element as a constituent element (for example, an alloy, a compound or a mixture). This is because a high energy density can be obtained by using such a material. In particular, it is more preferred to use such a negative electrode active material together with a carbon material because this enables a high energy density as well as excellent cycle characteristics to be obtained. In the present technology, the alloy includes, in addition to materials made of two or more kinds of metal elements, materials containing one or more kinds of metal elements and one or more kinds of metalloid elements. Further, the alloy may contain a non-metal element. The compositional structure of the alloy includes a solid solution, a eutectic (eutectic mixture), an intermetallic compound, and a material in which two or more kinds of these coexist.

Examples of such a negative electrode active material include a metallic element and a metalloid element capable of forming an alloy with lithium. Specific examples include magnesium, boron, aluminum, titanium, gallium (Ga), indium (In), silicon (Si), germanium (Ge), tin, lead (Pb), bismuth (Bi), cadmium (Cd), silver (Ag), zinc, hafnium (Hf), zirconium, yttrium (Y), palladium (Pd), and platinum (Pt). These materials may be crystalline or amorphous.

The negative electrode active material preferably contains, as a constituent element, a metal element or a metalloid element of 4B group in the short periodical table. The negative electrode active material more preferably contains at least one of silicon and tin as a constituent element. This is because silicon and tin each have a high capability of inserting and extracting lithium, so that a high energy density can be obtained. Examples of such a negative electrode active material include an elemental substance, alloy and compound of silicon, an elemental substance, alloy and compound of tin, and a material partially having a phase including one kind or two or more kinds of these.

Examples of the silicon alloy include silicon alloys containing, as the second constituent element other than silicon, at least one kind of the group consisting of tin, nickel, copper, iron, cobalt, manganese, zinc, indium, silver, titanium, germanium, bismuth, antimony (Sb) and chromium. Examples of the tin alloy include tin alloys containing, as the second constituent element other than tin, at least one kind of the group consisting of silicon, nickel, copper, iron, cobalt, manganese, zinc, indium, silver, titanium, germanium, bismuth, antimony and chromium.

Examples of the tin compound and the silicon compound include compounds containing oxygen or carbon, and these compounds may further contain the above-described second constituent elements in addition to tin or silicon.

Among these, as a Sn-based negative electrode active material, a SnCoC-containing material is preferable that contains cobalt, tin, and carbon as constituent elements and in which the carbon content is not less than 9.9% by mass and not more than 29.7% by mass and the cobalt proportion to the total of tin and cobalt is not less than 30% by mass and not more than 70% by mass. This is because such a composition range can provide a high energy density and excellent cycle characteristics.

The SnCoC-containing material may further contain other constituent elements as necessary. As the other constituent elements, for example, silicon, iron, nickel, chromium, indium, niobium, germanium, titanium, molybdenum, aluminum, phosphorus (P), gallium, and bismuth are preferable, and two or more thereof may be contained. This is because the capacity or cycle characteristics can be further improved.

The SnCoC-containing material has a phase including tin, cobalt and carbon, and the phase preferably has a low crystalline structure or an amorphous structure. In the SnCoC-containing material, at least part of carbon as the constituent element is preferably bonded to a metal element or a metalloid element as other constituent elements. This is because while it is considered that decrease in cycle characteristics occurs due to aggregation or crystallization of tin or the like, the aggregation or crystallization can be prevented by bonding carbon to another element.

An example of a measurement method of investigating a bonding state of elements includes X-ray photoelectron spectroscopy (XPS). In XPS, in the case of graphite, the peak of is orbit of carbon (Cis) is observed at 284.5 eV in the apparatus in which energy calibration is made so that the peak of 4f orbit of gold atom (Au4f) is observed at 84.0 eV. In the case of surface contamination carbon, the peak is observed at 284.8 eV. Meanwhile, in the case of higher electric charge density of carbon element, for example, when carbon is bonded to a metal element or a metalloid element, the peak of C1s is observed in the region lower than 284.5 eV. That is, when the peak of the composite wave of C1s obtained for the SnCoC-containing material is observed in the region lower than 284.5 eV, at least part of carbon contained in the SnCoC-containing material is bonded to the metal element or the metalloid element as other constituent element.

In the XPS measurement, for example, the peak of C1s is used for correcting the energy axis of spectrums. Since surface contamination carbon generally exists on the surface, the peak of C1s of the surface contamination carbon is set to in 284.8 eV, and this is used as an energy reference. In the XPS measurement, the waveform of the peak of C1s is obtained as a form including the peak of the surface contamination carbon and the peak of carbon in the SnCoC-containing material. Therefore, for example, the peak of the surface contamination carbon and the peak of carbon in the SnCoC-containing material are separated by analysis with use of commercially available software. In the analysis of the waveform, the position of the main peak existing on the lowest bound energy side is set to the energy reference (284.8 eV).

Examples of the other negative electrode active materials include metal oxides and polymer compounds capable of inserting and extracting lithium. Examples of the metal oxides include lithium titanium oxide containing titanium and lithium such as lithium titanate ($Li_4Ti_5O_{12}$), iron oxide, ruthenium oxide, and molybdenum oxide. Examples of the polymer compounds include polyacetylene, polyaniline, and polypyrrole.

As a binder, for example, at least one selected from resin materials such as polyvinylidene fluoride, polytetrafluoroethylene, polyacrylonitrile, styrene-butadiene rubber, and carboxymethyl cellulose, copolymers mainly containing these resin materials, and the like is used.

As a conductive agent, the same carbon material as that for the positive electrode active material layer 21B or the like can be used according to some embodiments.

The separator 23 isolates the positive electrode 21 and the negative electrode 22 from each other to prevent short circuit of a current due to contact between both the electrodes, and allows a lithium ion to pass therethrough. The separator 23 is constituted by, for example, a porous film made of resin such as polytetrafluoroethylene, polypropylene, and polyethylene. The separator 23 may have a structure in which two or more of the foregoing porous films are stacked. Among these, the porous film made of polyolefin is preferable, since such a film has a superior short circuit preventive effect and can improve safety of the battery by shutdown effect. In particular, polyethylene is preferable as a material for constituting the separator 23, since polyethylene can provide shutdown effect in a range of not less than 100° C. and not more than 160° C. and has superior electrochemical stability. In addition, it is possible to use a material obtained by copolymerizing or blending a resin having chemical stability with polyethylene or polypropylene. Alternatively, the porous film may have a structure of three or more layers in which a polypropylene layer, a polyethylene layer, and a polypropylene layer are sequentially stacked.

In the separator 23, a resin layer may be provided on one surface or each of both surfaces of the porous film serving as a base material. The resin layer is a porous matrix resin layer carrying an inorganic substance. This can provide oxidation resistance and suppress deterioration of the separator 23. As the matrix resin, for example, polyvinylidene fluoride, hexafluoropropylene (HFP), polytetrafluoroethylene or the like can be used, and copolymers thereof can also be used.

Examples of the inorganic substance can include metal, semiconductor, and oxides and nitrides of these. Examples of the metal include aluminum and titanium, and examples of the semiconductor include silicon and boron.

Preferably, the inorganic substance has substantially no conductivity and a large heat capacity. This is because when the heat capacity is large, such an inorganic substance is useful as a heat sink at the time of heat generation by current, and it becomes possible to further suppress thermal runaway of the battery. Examples of the inorganic substance include oxides and nitrides of alumina ($Al_2O_3$), boehmite (monohydrate of alumina), talc, boron nitride (BN), aluminum nitride (AlN), titanium dioxide ($TiO_2$), and silicon oxide (SiOx). The above-described inorganic substance may be contained as a base material in the porous film.

The particle size of the inorganic substance is preferably in a range of 1 nm to 10 µm. If the particle size is less than 1 nm, it is difficult to obtain the inorganic substance in the market, and even if such an inorganic substance is available, it is not suitable for cost. If the particle size is more than 10 µm, a distance between the electrodes becomes large, and the active material cannot be filled in a limited space in a sufficient amount, so that the battery capacity becomes low.

The resin layer can be formed, for example, as follows. That is, a slurry containing a matrix resin, a solvent, and an inorganic substance is applied on a base material (porous film), allowed to pass through a poor solvent of the matrix resin and a good solvent bath of the solvent so as to be subjected to phase separation, followed by drying.

An electrolytic solution impregnated in the positive electrode active material layer 21B, the negative electrode active material layer 22B, and the separator 23 includes a solvent and an electrolyte salt dissolved in this solvent. In order to improve the battery characteristics, the electrolytic solution may contain known additives.

As the solvent, a cyclic carbonate such as ethylene carbonate or propylene carbonate can be used. It is preferable to use one of ethylene carbonate and propylene carbonate, and it is particularly preferable to mix both of these for use. This is because the cycle characteristics can be improved.

In addition, as the solvent, it is preferable to mix a chain carbonate such as diethyl carbonate, dimethyl carbonate, ethylmethyl carbonate, or methyl propyl carbonate in addition to these cyclic carbonates. This is because high ionic conductivity can be obtained.

Further, the solvent preferably contains 2,4-difluoroanisole or vinylene carbonate. This is because 2,4-difluoroanisole can improve the discharge capacity, and vinylene carbonate can improve the cycle characteristics. Thus, use of these compounds in mixture is preferable because the discharge capacity and the cycle characteristics can be improved.

In addition to these compounds, examples of the solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3 dioxolane, methyl acetate, methyl propionate, acetonitrile, glutaronitrile, adiponitrile, methoxy acetonitrile, 3-methoxy propylonitrile, N,N-dimethylformamide, N-methylpyrrolidinone, N-methyloxazolidinone, N,N-dimethylimidazolidinone, nitromethane, nitroethane, sulfolane, dimethyl sulfoxide, and trimethyl phosphate.

A compound obtained by replacing at least some hydrogen atoms in these non-aqueous solvents with fluorine atoms may be preferable because such a compound may improve reversibility of electrode reaction depending on the types of electrodes to be combined.

Examples of the electrolyte salt include lithium salts, and the lithium salts can be used singly or in mixture of two or more kinds thereof. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, lithium difluoro[oxolato-O,O']borate, lithium bis(oxalate)borate, and LiBr. Among these lithium salts, $LiPF_6$ is preferable because $LiPF_6$ can provide high ionic conductivity and can improve cycle characteristics.

In the nonaqueous electrolyte secondary battery according to an embodiment, an open-circuit voltage (that is, a battery voltage) in a full charge state may be designed to be within a range of, for example, not less than 2.80 V and not more than 6.00 V or not less than 3.60 V and not more than 6.00 V, preferably not less than 4.25 V and not more than 6.00 V or not less than 4.20 V and not more than 4.50 V, more preferably not less than 4.30 V and not more than 4.55 V. For example, when the open-circuit voltage in the full charge state is set to not less than 4.25 V in a battery including a layered rock-salt type lithium composite oxide or the like as the positive electrode active material, an extraction amount of lithium per unit mass is large as compared with a 4.20-V battery even in the case of the same positive electrode active material. Therefore, the amounts of the positive electrode active material and the negative electrode active material are adjusted in response to the extraction amount of lithium, so that a high energy density is obtained.

In the nonaqueous electrolyte secondary battery having the configuration described herein, when charging is performed, for example, lithium ions are extracted from the positive electrode active material layer 21B and inserted into the negative electrode active material layer 22B through the electrolytic solution. On the other hand, when discharging is performed, for example, lithium ions are extracted from the negative electrode active material layer 22B and inserted into the positive electrode active material layer 21B through the electrolytic solution.

Next, an example of a method of manufacturing the nonaqueous electrolyte secondary battery according to the second embodiment of the present technology will be described according to an embodiment.

First, the positive electrode 21 is formed in the same manner as in the first embodiment.

For example, a negative electrode active material and a binder are mixed to prepare a negative electrode mixture, and the negative electrode mixture is dispersed in a solvent such as N-methyl-2-pyrrolidone, thus producing a paste-like negative electrode mixture slurry. Then, the negative electrode mixture slurry is applied on the negative electrode current collector 22A, the solvent is dried, and the dried mixture is compression molded with a rolling press machine or the like, so that the negative electrode active material layer 22B is formed, and the negative electrode 22 is produced.

Then, the positive electrode lead 25 is attached to the positive electrode current collector 21A by welding or the like, and the negative electrode lead 26 is attached to the negative electrode current collector 22A by welding or the like. Then, the positive electrode 21 and the negative electrode 22 are wound with the separator 23 interposed therebetween. Then, a tip end portion of the positive electrode lead 25 is welded to the safety valve mechanism 15, a tip end portion of the negative electrode lead 26 is welded to the battery can 11, and the wound positive electrode 21 and negative electrode 22 are sandwiched between a pair of the insulating plates 12 and 13 and housed inside the battery can 11. Then, after the positive electrode 21 and the negative electrode 22 are housed inside the battery can 11, the electrolyte solution is injected into the battery can 11 to impregnate the separator 23. Then, the battery lid 14, the safety valve mechanism 15, and the heat sensitive resistance element 16 are fixed to an opening end portion of the battery can 11 by caulking via the sealing gasket 17. Accordingly, the secondary battery shown in FIG. 4 is obtained.

Since the battery according to an embodiment includes the positive electrode 21 containing the positive electrode active material according to the embodiment described herein, the capacity of the battery can be increased.

Hereinafter, a configuration example of a battery according to an embodiment of the present technology will be described with reference to FIG. 6. This battery is a so-called laminated film type battery and has a flat or rectangular shape. In this battery, a wound electrode body 30 having a positive electrode lead 31 and a negative electrode lead 32 installed therein is housed in a film-shaped outer package member 40, and the battery can be smaller, lighter, and thinner.

Each of the positive electrode lead 31 and the negative electrode lead 32 goes from an inside of the outer package member 40 to an outside of the outer package member 40, and for example, is led out in the same direction. The positive electrode lead 31 and the negative electrode lead 32 are each made of a metal material such as aluminum, copper, nickel, or stainless steel, and have a thin plate shape or a network shape.

The outer package member 40 is made of, for example, a rectangular aluminum laminated film obtained by sticking a nylon film, an aluminum foil and a polyethylene film in this order. For example, the outer package member 40 is disposed such that a side of the polyethylene film faces the wound electrode body 30, and outer peripheral portions thereof are in close contact with each other by fusion or an adhesive. An adhesive film 41 is inserted between the outer package member 40 and each of the positive electrode lead 31 and the negative electrode lead 32 in order to prevent entrance of the outside air. The adhesive film 41 is made of a material having adhesion to each of the positive electrode lead 31 and the negative electrode lead 32, for example, of a polyolefin resin such as polyethylene, polypropylene, modified polyethylene, or modified polypropylene.

The outer package member 40 may be made of a laminated film having another structure, a polymer film such as polypropylene, or a metal film in place of the above-described aluminum laminated film. Alternatively, a laminated film having a polymer film stacked on one surface or each of both surfaces of an aluminum film as a core material may be used.

Figure 6:
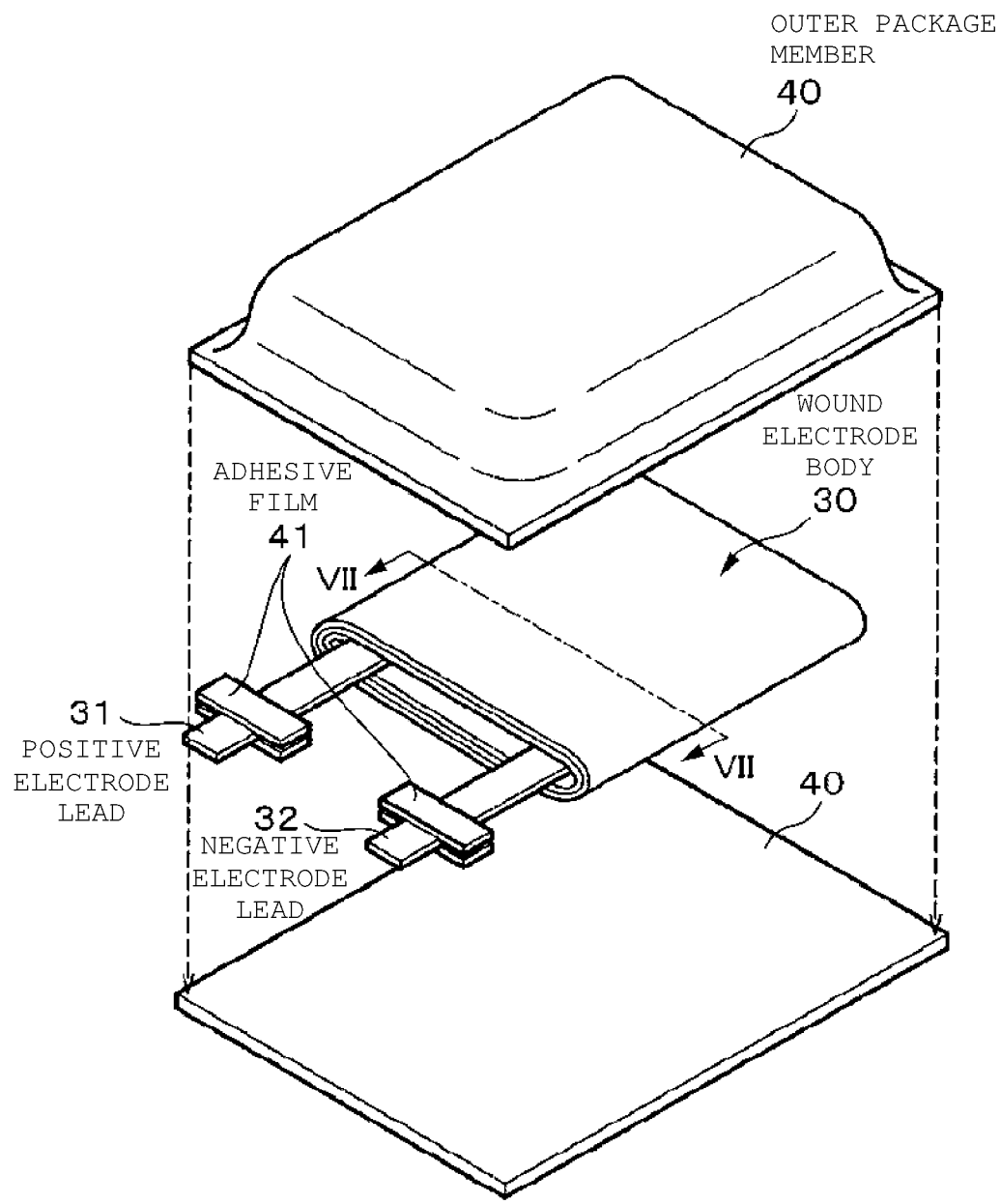
FIG. 6 is an exploded perspective view illustrating one configuration example of a nonaqueous electrolyte secondary battery according to an embodiment of the present technology.
Figure 7:
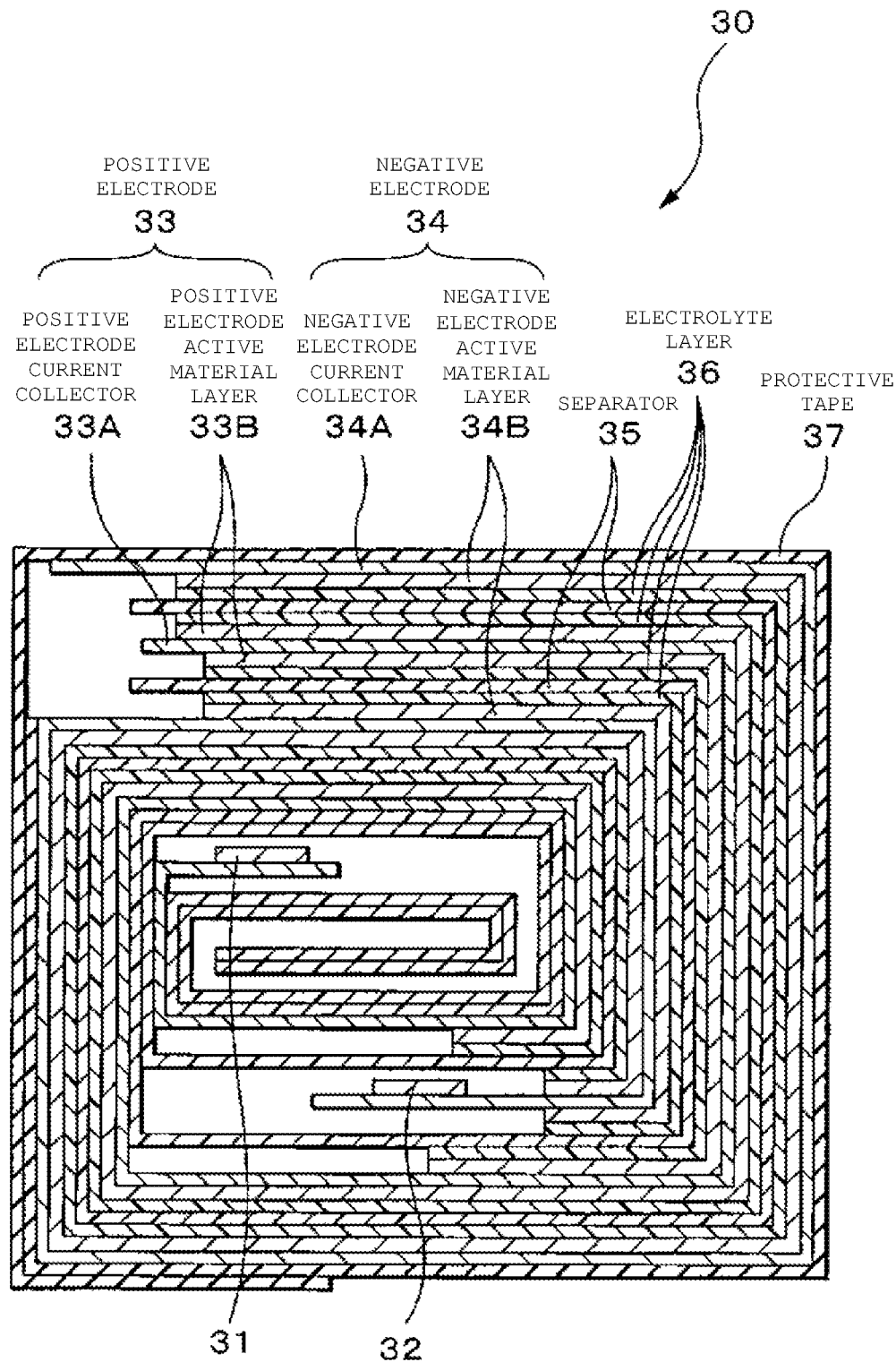
FIG. 7 is a cross-sectional view of the wound electrode body taken along line VII-VII of FIG. 6 in an embodiment.

FIG. 7 is a cross-sectional view of the wound electrode body 30 shown in FIG. 6 taken along line VII-VII. The wound electrode body 30 is produced by stacking a positive electrode 33 and a negative electrode 34 with a separator 35 and an electrolyte layer 36 interposed between the positive electrode 33 and the negative electrode 34 and winding the laminate, and an outermost peripheral portion thereof is protected by a protective tape 37.

The positive electrode 33 has a structure in which a positive electrode active material layer 33B is provided on one surface or each of both surfaces of a positive electrode current collector 33A. The negative electrode 34 has a structure in which a negative electrode active material layer 34B is provided on one surface or each of both surfaces of a negative electrode current collector 34A, and the negative electrode active material layer 34B and the positive electrode active material layer 33B are arranged to face each other. The configuration of each of the positive electrode current collector 33A, the positive electrode active material layer 33B, the negative electrode current collector 34A, the negative electrode active material layer 34B, and the separator 35 is the same as the configuration of each of the positive electrode current collector 21A, the positive electrode active material layer 21B, the negative electrode current collector 22A, the negative electrode active material layer 22B, and the separator 23 in the second embodiment.

The electrolyte layer 36 contains an electrolytic solution and a polymer compound serving as a holding material for holding the electrolytic solution therein, and is formed into a so-called gel form. The electrolyte layer 36 in a gel form is preferable because the electrolyte layer 36 not only can provide high ion conductivity, but also can prevent the liquid leakage of the battery. The electrolytic solution is the electrolytic solution according to the first embodiment. Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate. Polyacrylonitrile, polyvinylidene fluoride, polyhexafluoropropylene, or polyethylene oxide is preferable in terms of electrochemical stability.

An inorganic substance similar to the inorganic substance in the description of the resin layer of the separator 23 in the second embodiment may be contained in the electrolyte layer 36 in a gel form. This is because heat resistance can be further improved.

Next, an example of a method of manufacturing the nonaqueous electrolyte secondary battery according to an embodiment of the present technology will be described.

First, a precursor solution containing a solvent, an electrolyte salt, a polymer compound, and a mixed solvent is applied to each of the positive electrode 33 and the negative electrode 34, and the mixed solvent is volatilized, thereby forming the electrolyte layer 36. Then, the positive electrode lead 31 is attached to an end of the positive electrode current collector 33A by welding, and the negative electrode lead 32 is attached to an end of the negative electrode current collector 34A by welding. Then, the positive electrode 33 and the negative electrode 34 on each of which the electrolyte layer 36 has been formed are stacked with the separator 35 interposed therebetween, thereby forming a laminate. The laminate is wound in its longitudinal direction, and the protective tape 37 is adhered to the outermost peripheral portion, thereby forming the wound electrode body 30. Finally, for example, the wound electrode body 30 is sandwiched between the outer package members 40, and outer edge portions of the outer package members 40 are brought into close contact with each other by heat fusion or the like, thereby sealing the wound electrode body 30. At this time, the adhesive film 41 is inserted between the outer package member 40 and each of the positive electrode lead 31 and the negative electrode lead 32. Accordingly, the secondary battery shown in FIGS. 6 and 7 is obtained.

The secondary battery may be produced as follows. First, the positive electrode 33 and the negative electrode 34 are produced as described above, and the positive electrode lead 31 and the negative electrode lead 32 are attached to the positive electrode 33 and the negative electrode 34, respectively. Then, the positive electrode 33 and the negative electrode 34 are stacked with the separator 35 interposed therebetween and wound, and the protective tape 37 is adhered to the outermost peripheral portion, thereby forming a wound body. Then, this wound body is sandwiched between the outer package members 40, and the outer peripheral edges excluding one side are subjected to heat fusion to form a bag, and then the wound body is housed in the inside of the outer package member 40. Then, an electrolyte composition containing a solvent, an electrolyte salt, a monomer as a raw material of a polymer compound, a polymerization initiator and, as necessary, other materials such as a polymerization inhibitor is prepared and injected into the outer package member 40.

After the electrolyte composition is injected into the outer package member 40, a cavity of the outer package member 40 is hermetically sealed by heat fusion in a vacuum atmosphere. Then, the monomer is polymerized under heat to form a polymer compound, thereby forming the electrolyte layer 36 in a gel form. Accordingly, the secondary battery shown in FIG. 6 is obtained.

In another embodiment, a battery pack and an electronic device including the nonaqueous electrolyte secondary battery according to the embodiments will be described.

Figure 8:
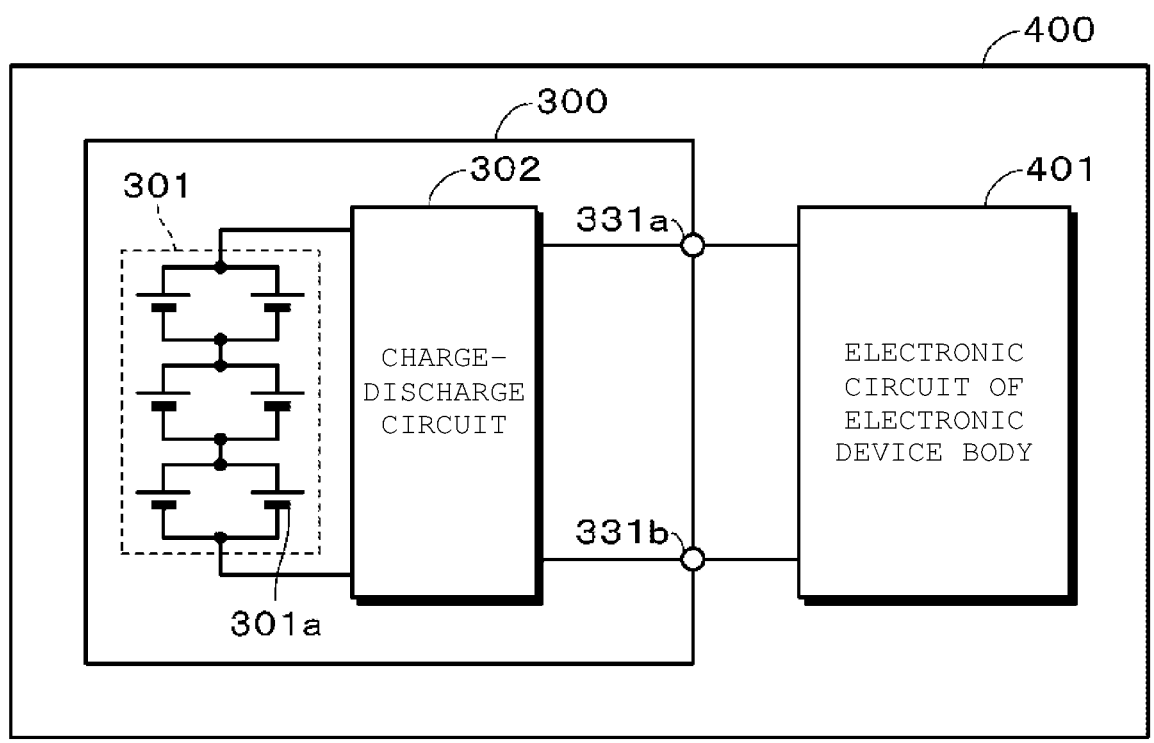
FIG. 8 is a block diagram illustrating one configuration example of a battery pack and an electronic device according to an embodiment of the present technology.

Hereinafter, each configuration example of a battery pack 300 and an electronic device 400 according to an embodiment of the present technology will be described with reference to FIG. 8. The electronic device 400 includes an electronic circuit 401 of an electronic device body and the battery pack 300. The battery pack 300 is electrically connected to the electronic circuit 401 through a positive electrode terminal 331a and a negative electrode terminal 331b. For example, the electronic device 400 has a configuration in which the battery pack 300 is freely attachable and removable by a user. The configuration of the electronic device 400 is not limited to this example, and the battery pack 300 may be incorporated in the electronic device 400 such that a user cannot remove the battery pack 300 from the electronic device 400.

During charging of the battery pack 300, the positive electrode terminal 331a and the negative electrode terminal 331b of the battery pack 300 are connected to a positive electrode terminal and a negative electrode terminal of a charger (not illustrated), respectively. On the other hand, during discharging of the battery pack 300 (during use of the electronic device 400), the positive electrode terminal 331a and the negative electrode terminal 331b of the battery pack 300 are connected to a positive electrode terminal and a negative electrode terminal of the electronic circuit 401, respectively.

Examples of the electronic device 400 include a notebook personal computer, a tablet computer, a mobile phone (for example, a smart phone), a personal digital assistant (PDA), a display device (for example, an LCD, an EL display, or electronic paper), an imaging device (for example, a digital still camera or a digital video camera), an audio device (for example, a portable audio player), a game device, a cordless handset phone machine, an electronic book, an electronic dictionary, a radio, a headphone, a navigation system, a memory card, a pacemaker, a hearing aid, an electric tool, an electric shaver, a refrigerator, an air conditioner, a television, a stereo, a water heater, a microwave oven, a dishwasher, a washing machine, a dryer, a lighting device, a toy, a medical device, a robot, a load conditioner, and a traffic signal. However, the electronic device 400 is not limited thereto.

For example, the electronic circuit 401 includes CPU, a peripheral logic unit, an interface unit, and a storage unit, and controls the entire electronic device 400 according to an embodiment.

The battery pack 300 includes an assembled battery 301 and a charge-discharge circuit 302. The assembled battery 301 is formed by connecting a plurality of secondary batteries 301a to each other in series and/or in parallel. For example, the plurality of secondary batteries 301a are connected to each other in n parallel m series (each of n and m is a positive integer). FIG. 8 shows an example in which six secondary batteries 301a are connected to each other in 2 parallel 3 series (2P3S). As the secondary battery 301a, the nonaqueous electrolyte secondary battery according to the embodiments described herein is used.

The charge-discharge circuit 302 is a controller that controls charging and discharging of the assembled battery 301. Specifically, during charging, the charge-discharge circuit 302 controls charging to the assembled battery 301. On the other hand, during discharging (that is, during use of the electronic device 400), the charge-discharge circuit 302 controls discharging to the electronic device 400.

In the embodiment described herein, the case where the battery pack 300 includes the assembled battery 301 formed by the plurality of secondary batteries 301a has been described as an example. However, the battery pack 300 may be provided with the single secondary battery 301a instead of the assembled battery 301.

In another embodiment, a power storage system including the nonaqueous electrolyte secondary battery according to the embodiments described herein in a power storage device will be described. This power storage system may be any system as long as the system uses electric power, and includes a simple electric power device. Examples of the electric power system include a smart grid, a home energy management system (HEMS), and a vehicle. The electric power system can also store electricity.

Figure 9:
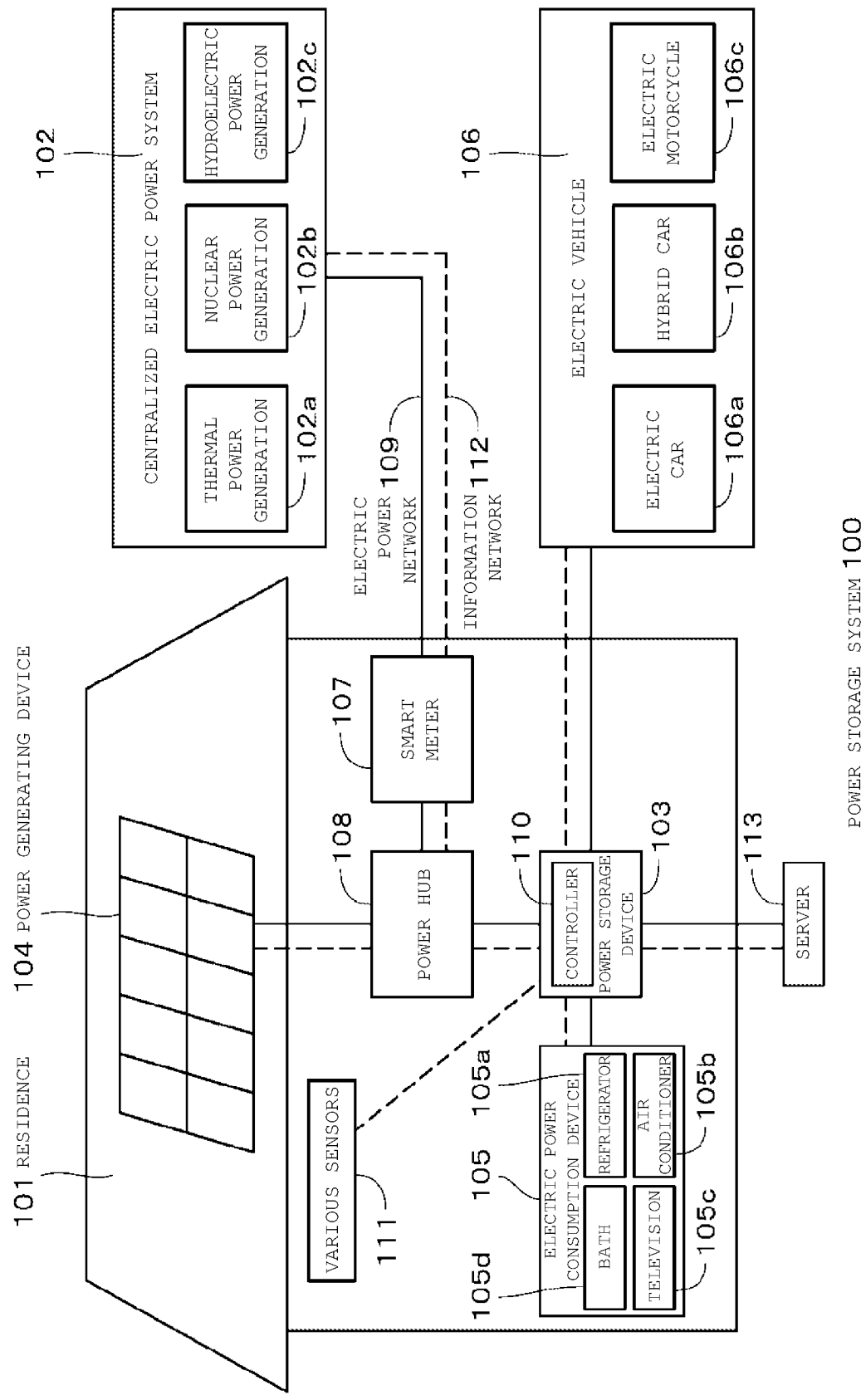
FIG. 9 is a schematic diagram illustrating one configuration example of a power storage system according to an embodiment of the present technology.

Hereinafter, a configuration example of a power storage system (electric power system) 100 according to the embodiment will be described with reference to FIG. 9. The power storage system 100 is a residential power storage system, and electric power is supplied from a centralized electric power system 102 such as thermal power generation 102a, nuclear power generation 102b, or hydroelectric power generation 102c to a power storage device 103 via an electric power network 109, an information network 112, a smart meter 107, a power hub 108, or the like. At the same time, electric power is supplied from an independent power source such as a home power generating device 104 to the power storage device 103. The electric power supplied to the power storage device 103 is stored. Electric power used in a residence 101 is supplied using the power storage device 103. Not only the residence 101 but also a building can use a similar power storage system.

The residence 101 is provided with the home power generating device 104, an electric power consumption device 105, the power storage device 103, a controller 110 for controlling devices, the smart meter 107, the power hub 108, and a sensor 111 for acquiring various information. The devices are connected to each other via the electric power network 109 and the information network 112. As the home power generating device 104, a solar cell, a fuel cell, or the like is used, and generated electric power is supplied to the electric power consumption device 105 and/or the power storage device 103. The electric power consumption device 105 is a refrigerator 105a, an air conditioner 105b, a television receiver 105c, a bath 105d, or the like. Furthermore, the electric power consumption device 105 further includes an electric vehicle 106. The electric vehicle 106 is an electric car 106*a*, a hybrid car 106*b*, an electric motorcycle 106*c*, or the like.

The power storage device 103 includes the nonaqueous electrolyte secondary battery according to the second or third embodiment. The smart meter 107 has a function of measuring a use amount of commercial electric power, and transmitting the measured use amount to an electric power company. The electric power network 109 may be any one of DC power supply, AC power supply, and non-contact power supply, or a combination of two or more of these.

Examples of the various sensors 111 include a human sensor, an illuminance sensor, an object detection sensor, a consumed electric power sensor, a vibration sensor, a contact sensor, a temperature sensor, and an infrared sensor. Information acquired by the various sensors 111 is transmitted to the controller 110. With the information from the sensors 111, weather conditions, human conditions, and the like are caught, and the electric power consumption device 105 is automatically controlled so as to minimize energy consumption. Furthermore, the controller 110 can transmit information on the residence 101 to an external electric power company or the like via internet.

The power hub 108 performs processing such as branching of an electric power line or DC-AC conversion. A communication method of the information network 112 connected to the controller 110 includes a method of using a communication interface such as UART (universal asynchronous receiver-transceiver: asynchronous serial communication transmitter/receiver circuit) and a method of using a sensor network by a wireless communication standard, such as Bluetooth (registered trademark), ZigBee, or Wi-Fi. The Bluetooth (registered trademark) method is applied to multimedia communication and can perform one-to-many communication. ZigBee uses a physical layer of IEEE (Institute of Electrical and Electronics Engineers) 802.15.4. IEEE802.15.4 is a name of a short-distance wireless network standard called PAN (personal area network) or W (wireless) PAN.

The controller 110 is connected to an external server 113. This server 113 may be managed by any one of the residence 101, an electric power company, and a service provider. For example, information transmitted or received by the server 113 is consumption electric power information, life pattern information, electric power charge, weather information, natural disaster information, or information about electric power transaction. Although a home electric power consumption device (for example, a television receiver) may transmit or receive the above information, an outside-home device (for example, a mobile phone) may transmit or receive the information. A device having a display function, such as a television receiver, a mobile phone, or a PDA (personal digital assistant) may display the information.

The controller 110 for controlling units is formed by a CPU (central processing unit), a RAM (random access memory), a ROM (read only memory), and the like, and is housed in the power storage device 103 in this example. The controller 110 is connected to the power storage device 103, the home power generating device 104, the electric power consumption device 105, the various sensors 111, and the server 113 via the information network 112, and for example, has a function of adjusting a use amount of commercial electric power and a power generation amount. In addition, the controller 110 may have a function of performing electric power transaction in an electric power market.

As described herein, the power storage device 103 can store not only electric power from the centralized electric power system 102 such as the thermal power generation 102*a*, the nuclear power generation 102*b*, or the hydroelectric power generation 102*c* but also electric power generated by the home power generating device 104 (solar power generation or wind power generation). Accordingly, even when the electric power generated by the home power generating device 104 fluctuates, control for keeping the amount of electric power to be sent to an outside constant or discharging by a necessary amount of electric power can be performed. For example, the following method of use is possible. That is, electric power obtained by solar power generation is stored in the power storage device 103, midnight electric power the charge of which is low at night is stored in the power storage device 103, and electric power stored in the power storage device 103 is used by discharging in daytime in which electric power charge is high.

In this example, the controller 110 housed in the power storage device 103 has been exemplified, but the controller 110 may be housed in the smart meter 107, or may be formed alone. Furthermore, the power storage system 100 may be used for a plurality of homes in a multiple dwelling house or a plurality of detached houses.

In another embodiment, an electric vehicle including the nonaqueous electrolyte secondary battery according to the second or third embodiment will be described.

Figure 10:
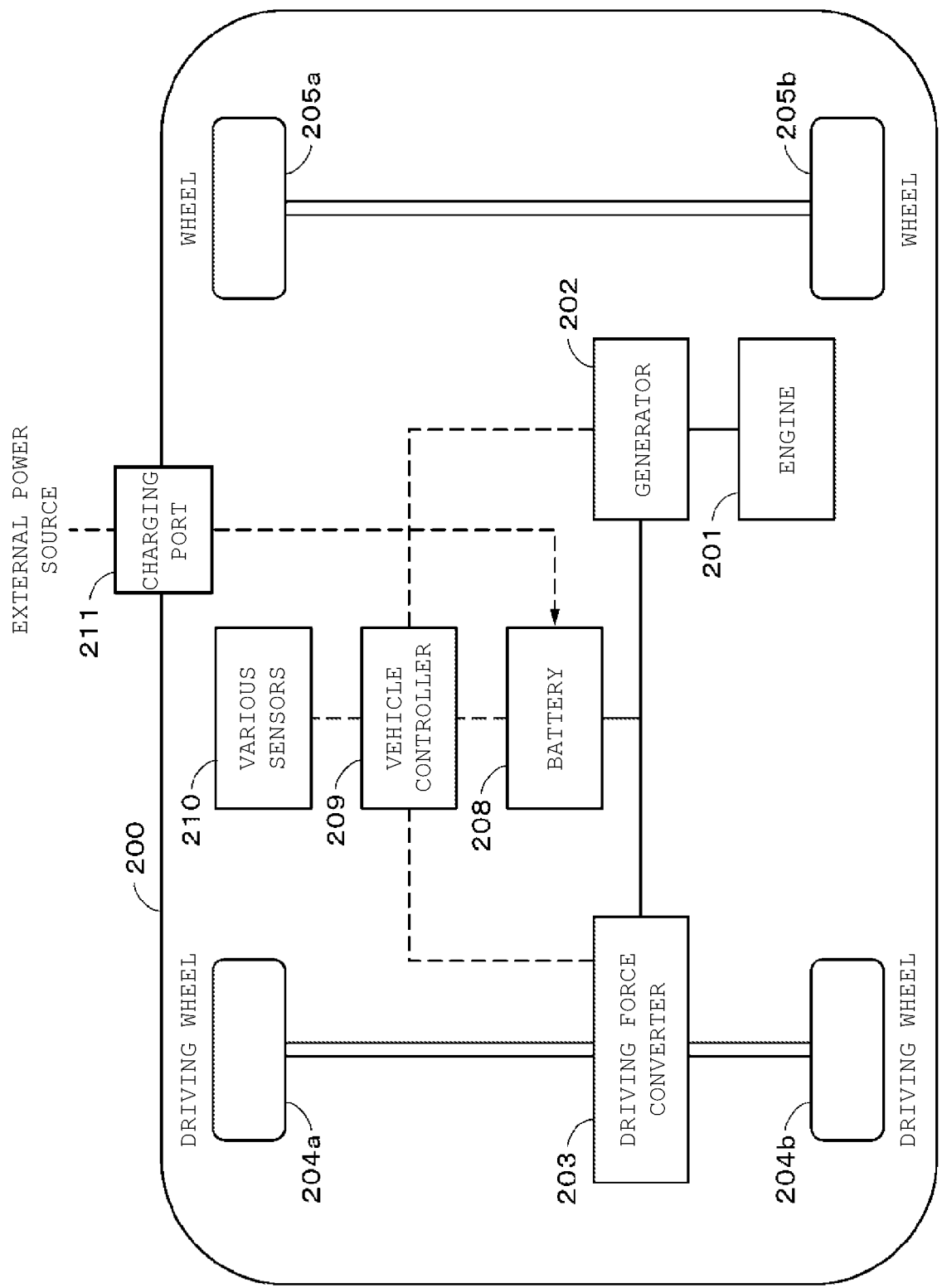
FIG. 10 is a schematic diagram illustrating one configuration example of an electric vehicle according to an embodiment of the present technology.

A configuration example of an electric vehicle according to another embodiment of the present technology will be described with reference to FIG. 10. A hybrid vehicle 200 is a hybrid vehicle using a series hybrid system. The series hybrid system is a car travelling with an electric power driving force converter 203 using electric power generated by a generator driven by an engine or electric power obtained by temporarily storing the generated electric power in a battery.

An engine 201, a generator 202, the electric power driving force converter 203, a driving wheel 204*a*, a driving wheel 204*b*, a wheel 205*a*, a wheel 205*b*, a battery 208, a vehicle controller 209, various sensors 210, and a charging port 211 are mounted in the hybrid vehicle 200. As the battery 208, the nonaqueous electrolyte secondary battery according to the second or third embodiment is used.

The hybrid vehicle 200 travels using the electric power driving force converter 203 as a power source. An example of the electric power driving force converter 203 is a motor. The electric power driving force converter 203 acts by electric power of the battery 208, and a rotating force of the electric power driving force converter 203 is transmitted to the driving wheels 204*a* and 204*b*. The electric power driving force converter 203 can be applied to both an AC motor and a DC motor by using DC-AC conversion or reverse conversion (AC-DC conversion) at necessary portions. The various sensors 210 control an engine speed through the vehicle controller 209, or control an opening degree (throttle opening degree) of a throttle valve (not illustrated). The various sensors 210 include a velocity sensor, an acceleration sensor, an engine speed sensor, and the like.

A rotating force of the engine 201 is transmitted to the generator 202, and electric power generated by the generator 202 can be stored in the battery 208 by the rotating force.

When the hybrid vehicle 200 is decelerated by a brake mechanism (not illustrated), a resistance force during the deceleration is added to the electric power driving force converter 203 as a rotating force, and regenerative electric power generated by the electric power driving force converter 203 due to this rotating force is stored in the battery 208.

By being connected to an external power source of the hybrid vehicle 200 through the charging port 211, the battery 208 receives electric power from the external power source by using the charging port 211 as an input port, and can store the received electric power.

Although not illustrated, an information processing device for performing information processing relating to vehicle control based on information on a nonaqueous electrolyte secondary battery may be included. An example of such an information processing device includes an information processing device for displaying a battery remaining amount based on information about the battery remaining amount of the nonaqueous electrolyte secondary battery according to an embodiment.

The description has been made by exemplifying a series hybrid car travelling with a motor using electric power generated by a generator driven by an engine or electric power obtained by temporarily storing the generated electric power in a battery. However, the present technology can also be applied effectively to a parallel hybrid car which uses the output of an engine and a motor as the driving force source and switches three modes as appropriate: driving with the engine only; driving with the motor only; and driving with the engine and the motor. In addition, the present technology can also be applied effectively to a so-called electric vehicle travelling by driving only with a driving motor without use of an engine.

EXAMPLES

Hereinafter, the present technology will be described specifically with examples, but the present technology is not limited only to the examples.

In the examples, the average particle sizes D1, D2, and D3, the particle disintegration rates α1, β, and α2, and the proportions or ratios R1 and R2 of the large particles, the middle particles, and the small particles are determined by the measurement method described in the embodiment.

Example 1

First, a positive electrode active material was prepared by mixing the following large particles, middle particles, and small particles (see Table 1).

Large particles: the large particles are aggregated particles formed by aggregation of primary particles made of $LiNi_{0.8}Co_{0.15}Al_{0.05}O_2$ and having an average particle size of 300 nm, and are substantially spherical positive electrode active material particles having an average particle size D1 of 17 μm and a particle disintegration rate α1 of 10%.

Middle particles: the middle particles are aggregated particles formed by aggregation of primary particles made of $LiNi_{0.8}Co_{0.15}Al_{0.05}O_2$ and having an average particle size of 800 nm, and are substantially spherical positive electrode active material particles having an average particle size D2 of 7 μm and a particle disintegration rate β of 80%.

Small particles: the small particles are aggregated particles formed by aggregation of primary particles made of $LiNi_{0.8}Co_{0.15}Al_{0.05}O_2$ and having an average particle size of 300 nm, and are substantially spherical positive electrode active material particles having an average particle size D3 of 4 μm and a particle disintegration rate α2 of 10%.

Here, the reason why the average particle size of the primary particles constituting the middle particles is made larger than the average particle size of the primary particles constituting the large particles and the middle particles is that the particle disintegration at the time of positive electrode press is more likely to occur as the primary particle size becomes larger. In consideration of such characteristics, in Example 1, the particle disintegration rates α1, α2, and β of the particles were adjusted according to the average particle size of the primary particles.

A mixing ratio of the particles was adjusted so that the large particles, the middle particles, and the small particles satisfied the following relationships (a), (b) and (c).

(a) The proportion R1 $(=(M1/(M1+M3))\times100)$ of the content M1 of the large particles to the total amount of the content M1 of the large particles and the content M3 of the small particles is 75 vol %.

(b) The proportion R2 $(=(M3/(M1+M3))\times100)$ of the content M3 of the small particles to the total amount of the content M1 of the large particles and the content M3 of the small particles is 25 vol %.

(c) The proportion R3 $(=(M2/M3)\times100)$ of the content M2 of the middle particles to the content M3 of the small particles is 30 vol %.

Then, 97 parts by mass of the prepared positive electrode active material, 1.5 parts by mass of graphite as a conductive agent, and 1.5 parts by mass of polyvinylidene fluoride (PVDF) as a binder were mixed to prepare a positive electrode mixture. The positive electrode mixture was dispersed in N-methyl-2-pyrrolidone as a solvent to prepare a paste-like positive electrode mixture slurry. Then, the positive electrode mixture slurry was uniformly applied onto one surface of a positive electrode current collector made of a strip-shaped aluminum foil having a thickness of 15 μm and then dried. The positive electrode mixture slurry was further applied onto the other surface of the positive electrode current collector and dried. Then, the resultant was compression molded by a roll press machine, thereby forming a positive electrode active material layer. At that time, the linear pressure of the roll press machine was 10 kN/cm. Thus, a target positive electrode was obtained.

Example 2, Comparative Example 1

As shown in Table 1, each of positive electrodes was obtained in the same manner as in Example 1 except that the proportion R3 of the content M2 of the middle particles to the content M3 of the small particles was changed.

Examples 3 to 5, Comparative Examples 2 to 4

As shown in Table 1, each of positive electrodes was obtained in the same manner as in Example 1 except that the particle disintegration rate α1 of the large particle, the particle disintegration rate β of the middle particle, and the particle disintegration rate α2 of the small particle were changed.

Examples 6 to 10, Comparative Examples 5 to 10

As shown in Table 1, each of positive electrodes was obtained in the same manner as in Example 1 except that the average particle size D1 of the large particles, the average particle size D2 of the middle particles, and the average particle size D3 of the small particles were changed.

Example 11

As shown in Table 1, a positive electrode was obtained in the same manner as in Example 1 except that aggregated particles formed by aggregation of primary particles made of $LiNi_{0.5}Co_{0.2}Mn_{0.3}O_2$ and having an average particle size of 300 nm were used as the large particles and the small particles.

Example 12, Comparative Example 11

As shown in Table 1, each of positive electrodes was obtained in the same manner as in Example 11 except that the particle disintegration rate β of the middle particle was changed.

Comparative Example 12

As shown in Table 1, a positive electrode was obtained in the same manner as in Example 11 except that aggregated particles formed by aggregation of primary particles made of $LiNi_{0.5}Co_{0.2}Mn_{0.3}O_2$ and having an average particle size of 800 nm were used as the middle particles, and the particle disintegration rate β of the middle particle was changed.

Example 13

As shown in Table 1, a positive electrode was obtained in the same manner as in Example 1 except that primary particles (non-aggregated particles) made of $LiCoO_2$ and having an average particle size of 17 μm were used as the large particles, and primary particles (non-aggregated particles) made of $LiCoO_2$ and having an average particle size of 4 μm were used as the small particles.

Comparative Example 13

As shown in Table 1, a positive electrode was obtained in the same manner as in Example 13 except that the particle disintegration rate β of the middle particle was changed.

[Evaluation]

A volume density of each of the positive electrodes thus obtained was determined. The results are shown in Table 1.

Table 1 shows the configurations and evaluation results of the positive electrodes of Examples 1 to 13 and Comparative Examples 1 to 13.

TABLE 1

| | Types of positive electrode active material particles Large particles/ middle particles/ small particles | Average particle size | | | Particle disintegration rate | | | | Volume |
|---|---|---|---|---|---|---|---|---|---|
| | | D1 [μm] | D2 [μm] | D3 [μm] | α1 [%] | β [%] | α2 [%] | R3 [vol %] | density [g/cm³] |
| Example 1 | NCA/NCA/NCA | 17 | 7 | 4 | 10 | 80 | 10 | 30 | 3.73 |
| Example 2 | NCA/NCA/NCA | 17 | 7 | 4 | 10 | 80 | 10 | 50 | 3.67 |
| Example 3 | NCA/NCA/NCA | 17 | 7 | 4 | 20 | 80 | 10 | 30 | 3.70 |
| Example 4 | NCA/NCA/NCA | 17 | 7 | 4 | 10 | 80 | 20 | 30 | 3.71 |
| Example 5 | NCA/NCA/NCA | 17 | 7 | 4 | 10 | 70 | 10 | 30 | 3.70 |
| Example 6 | NCA/NCA/NCA | 25 | 7 | 4 | 10 | 80 | 10 | 30 | 3.69 |
| Example 7 | NCA/NCA/NCA | 17 | 12 | 4 | 10 | 80 | 10 | 30 | 3.67 |
| Example 8 | NCA/NCA/NCA | 17 | 7 | 6 | 10 | 80 | 10 | 30 | 3.66 |
| Example 9 | NCA/NCA/NCA | 17 | 3 | 1 | 10 | 80 | 10 | 30 | 3.69 |
| Example 10 | NCA/NCA/NCA | 12 | 7 | 4 | 10 | 80 | 10 | 30 | 3.66 |
| Example 11 | NCM/NCA/NCM | 17 | 7 | 4 | 10 | 80 | 10 | 30 | 3.53 |
| Example 12 | NCM/NCA/NCM | 17 | 7 | 4 | 10 | 70 | 10 | 30 | 3.48 |
| Example 13 | LCO/NCA/LCO | 17 | 7 | 4 | 10 | 80 | 10 | 30 | 3.95 |
| Comparative Example 1 | NCA/NCA/NCA | 17 | 7 | 4 | 10 | 80 | 10 | 70 | 3.61 |
| Comparative Example 2 | NCA/NCA/NCA | 17 | 7 | 4 | 30 | 80 | 10 | 30 | 3.63 |
| Comparative Example 3 | NCA/NCA/NCA | 17 | 7 | 4 | 10 | 80 | 30 | 30 | 3.64 |
| Comparative Example 4 | NCA/NCA/NCA | 17 | 7 | 4 | 10 | 40 | 10 | 30 | 3.62 |
| Comparative Example 5 | NCA/NCA/NCA | 17 | 4 | 6 | 10 | 80 | 10 | 30 | 3.62 |
| Comparative Example 6 | NCA/NCA/NCA | 30 | 7 | 4 | 10 | 80 | 10 | 30 | 3.63 |
| Comparative Example 7 | NCA/NCA/NCA | 17 | 17 | 4 | 10 | 80 | 10 | 30 | 3.62 |
| Comparative Example 8 | NCA/NCA/NCA | 17 | 7 | 12 | 10 | 80 | 10 | 30 | 3.56 |
| Comparative Example 9 | NCA/NCA/NCA | 17 | 2 | 1 | 10 | 80 | 10 | 30 | 3.63 |
| Comparative Example 10 | NCA/NCA/NCA | 7 | 3 | 1 | 10 | 80 | 10 | 30 | 3.58 |
| Comparative Example 11 | NCM/NCA/NCM | 17 | 7 | 4 | 10 | 50 | 10 | 30 | 3.42 |

TABLE 1-continued

| | Types of positive electrode active material particles Large particles/ middle particles/ small particles | Average particle size | | | Particle disintegration rate | | | | Volume density [g/cm³] |
|---|---|---|---|---|---|---|---|---|---|
| | | D1 [μm] | D2 [μm] | D3 [μm] | α1 [%] | β [%] | α2 [%] | R3 [vol %] | |
| Comparative Example 12 | NCM/NCM/NCM | 17 | 7 | 4 | 10 | 10 | 10 | 30 | 3.37 |
| Comparative Example 13 | LCO/NCA/LCO | 17 | 7 | 4 | 10 | 30 | 10 | 30 | 3.72 |

D1: average particle size of large particles,
D2: average particle size of middle particles,
D3: average particle size of small particles
α1: particle disintegration rate of large particle,
α2: particle disintegration rate of small particle,
β: particle disintegration rate of middle particle
R3: proportion R3 (=(M2/M3) × 100) of content M2 of middle particles to content M3 of small particles From Table 1, the following can be seen.

In Examples 1 to 13, the average particle sizes D1, D2, and D3 of the large particles, middle particles, and small particles satisfy the relationships of D1 of 12 to 25 μm, D2 of 3 to 12 μm, and D3 of 1 to 6 μm; the large particles, middle particles, and the small particles are adjusted in their mixing proportions to satisfy the relationships of R1 of 55 to 85 vol %, R2 of 15 to 45 vol %, and R3≤50 vol %; and the particle disintegration rates α1, β, and α2 of the large particle, middle particle, and small particle satisfy the relationships of α1≤20%, 70%≤β, and α2≤20%. Thus, the volume density of the positive electrode is increased.

In Comparative Example 1, the middle particles and the small particles are adjusted in their mixing proportions to satisfy the relationship R3≤50 vol %. Thus, the volume density of the positive electrode is not increased.

In Comparative Examples 2 to 4, the particle disintegration rates α1, β, and α2 of the large particle, middle particle, and small particle do not satisfy the relationships of α1≤20%, α2≤20% and 70%≤β. Thus, the volume density of the positive electrode is not increased.

In Comparative Example 5, the average particle sizes D1, D2, and D3 of the large particles, middle particles, and small particles do not satisfy the relationship of D1>D2>D3. Thus, the volume density of the positive electrode is not increased.

In Comparative Examples 6 to 10, the average particle sizes D1, D2, and D3 of the large particles, middle particles, and small particles do not satisfy the relationships of D1 of 12 to 25 μm, D2 of 3 to 12 μm, and D3 of 1 to 6 μm. Thus, the volume density of the positive electrode is not increased.

In Comparative Examples 11 to 13, the particle disintegration rate β of the middle particle does not satisfy the relationship of 70%≤β. Thus, the volume density of the positive electrode is not increased.

In Examples 11 and 12 and Comparative Examples 11 and 12, there is a tendency that the volume density of the positive electrode becomes lower as compared with other examples and comparative examples. This is because the synthesis temperature of NCM is higher than that of NCA; the synthesis conditions between NCM and NCA are different from each other, such as progress of sintering between primary particles; and secondary particles formed by aggregation of primary particles made of NCM have particle properties of being hard to be crushed.

In Example 13 and Comparative Example 13, LCO is used instead of NCA as a material for the large particles and the small particles. However, as long as the large particles, the middle particles, and the small particles satisfy the above relationship, the volume density of the positive electrode can be increased. When LCO is used as the material for the large particles and the small particles, there is a tendency that the volume density of the positive electrode becomes higher as compared with the case of using NCA as the material for the large particles and the small particles. This is due to the following reason. That is, in the case of using primary particles made of LCO as the large particles and the small particles, the positive electrode active material is closely packed in the large particles and the small particles as compared with the case of using secondary particles formed by aggregation of primary particles made of NCA as the large particles and the small particles. The surface roughness of the large particles and small particles made of LCO is smaller than the surface roughness of the large particles and small particles made of NCA. For this reason, the large particles and the small particles tend to be more easily crushed at the time of pressing, and thus exhibit the above tendency. Since particles made of LCO are primary particles rather than aggregated particles, it is difficult to use LCO as a material for the middle particles required to be aggregated particles.

The embodiments, variations thereof, and examples of the present technology have been specifically described above; however, the present technology is not limited to the above-described embodiments, variations of the embodiments, and examples. Various modifications of the present technology can be made based on the technical spirit of the present technology.

For example, the configurations, the methods, the processes, the shapes, the materials, the numerical values, and the like mentioned in the above-described embodiments, variations of the embodiments, and examples are merely examples. Different configurations, methods, processes, shapes, materials, numerical values, and the like may be used as necessary.

Further, the configuration, the methods, the processes, the shapes, the materials, the numerical values and the like in the above-described embodiments, variations of the embodiments, and examples may be combined insofar as they are not departing from the spirit of the present technology.

In the embodiments and examples as described herein, examples in which the present technology is applied to cylindrical and laminated film type batteries have been described; however, the shape of the battery is not particularly limited. For example, the present technology can be applied to flexible batteries mounted on wearable terminals such as smart watches, head mounted displays, and iGlass (registered trademark), batteries such as rectangular and coin type batteries, and the like.

Further, in the embodiments and examples described herein, an example in which the present technology is applied to a battery having a wound structure has been described; however, the structure of the battery is not limited thereto, but the present technology can be applied to a battery having a structure in which a positive electrode and a negative electrode are folded or stacked.

Further, in the embodiments and examples described herein, the configuration in which the electrode includes the current collector and the active material layer has been described as an example; however, the configuration of the electrode is not limited thereto. For example, the electrode may be formed only of the active material layer.

Furthermore, in the above-described embodiments and examples, an example in which the positive electrode includes the binder and the conductive agent has been described; however, the binder and the conductive agent may be added as necessary, and the positive electrode may not include at least one of them.

In the embodiments and examples described herein, examples in which the present technology is applied to the positive electrode active material and the positive electrode have been described; however, the present technology is not limited thereto and may be applied to the negative electrode active material and the negative electrode.

In the embodiments and examples described herein, examples in which the large particles and the small particles are substantially spherical have been described; however, the present technology is not limited thereto, and each shape of the large particles and the small particles may be, for example, a substantially ellipsoidal shape or a polyhedral shape.

The present technology is described below in further detail according to an embodiment (1)

A positive electrode including a first active material particle, a second active material particle, and a third active material particle, in which the second active material particle is an aggregated particle formed by aggregation of primary particles, an average particle size D1 of the first active material particle, an average particle size D2 of the second active material particle, and an average particle size D3 of the third active material particle satisfy a relationship of D1>D2>D3, and the first active material particle has a particle disintegration rate α1 of not more than 20%, the third active material particle has a particle disintegration rate α2 of not more than 20%, and the second active material particle has a particle disintegration rate β of not less than 70%.

(2)

The positive electrode according to (1), in which the first active material particle and the third active material particle are aggregated particles formed by aggregation of primary particles.

(3)

The positive electrode according to (1), in which the first active material particle and the third active material particle are primary particles.

(4)

The positive electrode according to any one of (1) to (3), in which the average particle size D1 of the first active material particle is not less than 12 μm and not more than 25 μm, the average particle size D2 of the second active material particle is not less than 3 μm and not more than 12 μm, and the average particle size D3 of the third active material particle is not less than 1 μm and not more than 6 μm.

(5)

The positive electrode according to any one of (1) to (4), in which a proportion ((M1/(M1+M3))×100) of a content M1 of the first active material particle to a total amount of the content M1 of the first active material particle and a content M3 of the third active material particle is not less than 55 vol % and not more than 85 vol %, a proportion ((M3/(M1+M3))×100) of the content M3 of the third active material particle to the total amount of the content M1 of the first active material particle and the content M3 of the third active material particle is not less than 15 vol % and not more than 45 vol %, and a proportion ((M2/M3)×100) of a content M2 of the second active material particle to the content M3 of the third active material particle is not more than 50 vol %.

(6)

The positive electrode according to any one of (1) to (5), in which the first active material particle and the third active material particle each have an average collapse strength of not less than 300 MPa, and the second active material particle has an average collapse strength of not more than 100 MPa.

(7)

The positive electrode according to (2), in which the first active material particle and the third active material particle each have average composition represented by formula (1) below, and the second active material particle has average composition represented by formula (2) below:

$$Li_{v1}Ni_{w1}M1'_{x1}O_{z1} \quad (1)$$

(In the formula, 0<v1<2, w1+x1≤1, 0.2≤w1≤1, 0≤x1≤0.7, 0<z1<3, and M1' is at least one element consisting of transition metals such as Co (cobalt), Fe (iron), Mn (manganese), Cu (copper), Zn (zinc), Al (aluminum), Cr (chromium), V (vanadium), Ti (titanium), Mg (magnesium), and Zr (zirconium)), and $$Li_{v2}Ni_{w2}M2'_{x2}O_{z2} \quad (2)$$

(In the formula, 0<v2<2, w2+x2≤1, 0.65≤w2≤1, 0≤x2≤0.35, 0<z2<3, and M2' is at least one element consisting of transition metals such as Co (cobalt), Fe (iron), Mn (manganese), Cu (copper), Zn (zinc), Al (aluminum), Cr (chromium), V (vanadium), Ti (titanium), Mg (magnesium), and Zr (zirconium)).

(8)

The positive electrode according to (3), in which the first active material particle and the third active material particle each have average composition represented by formula (3) below, and the second active material particle has average composition represented by formula (4) below:

$$Li_{v3}Co_{w3}M3'_{x3}O_{z3} \quad (3)$$

(In the formula, 0<v3<2, w3+x3≤1, 0.8≤w3≤1, 0≤x3≤0.2, 0<z3<3, and M3' is at least one element consisting of transition metals such as Ni (nickel), Fe (iron), Mn (manganese), Cu (copper), Zn (zinc), Al (aluminum), Cr (chromium), V (vanadium), Ti (titanium), Mg (magnesium), and Zr (zirconium)), and $$Li_{v4}Ni_{w4}M4'_{x4}O_{z4} \quad (4)$$

(In the formula, $0<v4<2$, $w4+x4\leq1$, $0.65\leq w4\leq1$, $0\leq x4\leq0.35$, $0<z4<3$, and M4' is at least one element consisting of transition metals such as Co (cobalt), Fe (iron), Mn (manganese), Cu (copper), Zn (zinc), Al (aluminum), Cr (chromium), V (vanadium), Ti (titanium), Mg (magnesium), and Zr (zirconium)).

(9)

A positive electrode active material including a first active material particle, a second active material particle, and a third active material particle,
in which
the second active material particle is an aggregated particle formed by aggregation of primary particles,
an average particle size D1 of the first active material particle, an average particle size D2 of the second active material particle, and an average particle size D3 of the third active material particle satisfy a relationship of D1>D2>D3, and
the first active material particle has a particle disintegration rate α1 of not more than 20%, the third active material particle has a particle disintegration rate α2 of not more than 20%, and the second active material particle has a particle disintegration rate β of not less than 70%.

(10)

A battery including:
the positive electrode according to any one of (1) to (8);
a negative electrode; and
an electrolyte.

(11)

A battery pack including:
the battery according to (10); and
a controller for controlling the battery.

(12)

An electronic device including the battery according to (10) and receiving supply of electric power from the battery.

(13)

An electric vehicle including:
the battery according to (10);
a convertor that receives supply of electric power from the battery and converts the power into driving force of the vehicle; and
a controller that performs information processing relating to vehicle control based on information on the battery.

(14)

A power storage device including the battery according to (10) and supplying electric power to an electronic device connected to the battery.

(15)

The power storage device according to (14), including an electric power information controller that transmits a signal to or receives the signal from another device via a network, and performing charge-discharge control of the battery based on information received by the electric power information controller.

(16)

An electric power system including the battery according to (10) and receiving supply of electric power from the battery.

(17)

The electric power system according to (16), in which electric power is supplied to the battery from one of a power generating device and an electric power network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A positive electrode, comprising:
a first active material particle, a second active material particle, and a third active material particle,
wherein
an average particle size D1 of the first active material particle, an average particle size D2 of the second active material particle, and an average particle size D3 of the third active material particle satisfy a relationship of D1>D2>D3,
wherein the first active material particle has a first particle disintegration rate α1 and the third active material particle has a third particle disintegration rate α2, and the first particle disintegration rate α1 and the third particle disintegration rate α2 are both not more than 20%, and
wherein the second active material particle has a second particle disintegration rate β of not less than 70%.

2. The positive electrode according to claim 1, wherein the second active material particle includes an aggregation of second primary particles.

3. The positive electrode according to claim 1, wherein the average particle size D1 of the first active material particle is not less than 12 μm and not more than 25 μm, the average particle size D2 of the second active material particle is not less than 3 μm and not more than 12 μm, and
the average particle size D3 of the third active material particle is not less than 1 μm and not more than 6 μm.

4. The positive electrode according to claim 1, wherein a first ratio ((M1/(M1+M3))×100) of a content M1 of the first active material particle to a total amount of the content M1 of the first active material particle and a content M3 of the third active material particle is not less than 55 vol % and not more than 85 vol %,
a second ratio ((M3/(M1+M3))×100) of the content M3 of the third active material particle to the total amount of the content M1 of the first active material particle and the content M3 of the third active material particle is not less than 15 vol % and not more than 45 vol %, and
a third ratio ((M2/M3)×100) of a content M2 of the second active material particle to the content M3 of the third active material particle is not more than 50 vol %.

5. The positive electrode according to claim 1, wherein the first active material particle and the third active material particle each have an average collapse strength of not less than 300 MPa, and
the second active material particle has an average collapse strength of not more than 100 MPa.

6. The positive electrode according to claim 1, wherein the first active material particle and the third active material particle each include an aggregation of particles.

7. The positive electrode according to claim 6, wherein the first active material particle and the third active material particle each have a composition represented by formula (1) below, and the second active material particle has a composition represented by formula (2) below:

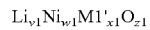  (1)

wherein $0<v1<2$, $w1+x1\leq1$, $0.2\leq w1\leq1$, $0\leq x1\leq0.7$, $0<z1<3$, and M1' includes one or more elements of transition metals selected from the group consisting of Co (cobalt), Fe (iron), Mn (manganese), Cu (copper), Zn (zinc), Al (aluminum), Cr (chromium), V (vanadium), Ti (titanium), Mg (magnesium), and Zr (zirconium), and $$Li_{v2}Ni_{w2}M2'_{x2}O_{z2} \qquad (2)$$

wherein $0<v2<2$, $w2+x2\leq1$, $0.65\leq w2\leq1$, $0\leq x2\leq0.35$, $0<z2<3$, and M2' includes one or more elements of transition metals selected from the group consisting of Co (cobalt), Fe (iron), Mn (manganese), Cu (copper), Zn (zinc), Al (aluminum), Cr (chromium), V (vanadium), Ti (titanium), Mg (magnesium), and Zr (zirconium).

8. The positive electrode according to claim 1, wherein the first active material particle includes a first primary particle and the third active material particle includes a third primary particle.

9. The positive electrode according to claim 8, wherein the first active material particle and the third active material particle each have a composition represented by formula (3) below, and the second active material particle has a composition represented by formula (4) below:

$$Li_{v3}Co_{w3}M3'_{x3}O_{z3} \qquad (3)$$

wherein $0<v3<2$, $w3+x3\leq1$, $0.8\leq w3\leq1$, $0\leq x3\leq0.2$, $0<z3<3$, and M3' includes one or more elements of transition metals selected from the group consisting of Ni (nickel), Fe (iron), Mn (manganese), Cu (copper), Zn (zinc), Al (aluminum), Cr (chromium), V (vanadium), Ti (titanium), Mg (magnesium), and Zr (zirconium), and $$Li_{v4}Ni_{w4}M4'_{x4}O_{z4} \qquad (4)$$

wherein $0<v4<2$, $w4+x4\leq1$, $0.65\leq w4\leq1$, $0\leq x4\leq0.35$, $0<z4<3$, and M4' includes one or more elements of transition metals selected from the group consisting of Co (cobalt), Fe (iron), Mn (manganese), Cu (copper), Zn (zinc), Al (aluminum), Cr (chromium), V (vanadium), Ti (titanium), Mg (magnesium), and Zr (zirconium).

10. A battery comprising:
the positive electrode according to claim 1;
a negative electrode; and
an electrolyte.

11. A battery pack comprising:
the battery according to claim 10; and
a controller configured to control the battery.

12. An electronic device comprising the battery according to claim 10, wherein the electronic device is configured to receive supply of electric power from the battery.

13. An electric vehicle comprising:
the battery according to claim 10;
a convertor configured to receive supply of electric power from the battery and convert the power into driving force of the electric vehicle; and
a controller configured to perform information processing relating to vehicle control based on information on the battery.

14. A power storage device comprising the battery according to claim 10, wherein the power storage device is configured to supply electric power to an electronic device connected to the battery.

15. The power storage device according to claim 14, comprising an electric power information controller configured to transmit a signal to or receive the signal from another device via a network, and performing charge-discharge control of the battery based on information received by the electric power information controller.

16. An electric power system comprising the battery according to claim 10, wherein the electric power system is configured to receive supply of electric power from the battery.

17. The electric power system according to claim 16, wherein electric power is supplied to the battery from one of a power generating device and an electric power network.

18. A positive electrode active material, comprising:
a first active material particle, a second active material particle, and a third active material particle,
wherein
an average particle size D1 of the first active material particle, an average particle size D2 of the second active material particle, and an average particle size D3 of the third active material particle satisfy a relationship of D1>D2>D3,
wherein the first active material particle has a first particle disintegration rate α1 and the third active material particle has a third particle disintegration rate α2, and the first particle disintegration rate α1 and the third particle disintegration rate α2 are both not more than 20%, and
wherein the second active material particle has a second particle disintegration rate β of not less than 70%.

19. The positive electrode active material according to claim 18, wherein the second active material particle includes an aggregation of second primary particles.

* * * * *